AIRPLANE TOOLING

Original Filed Nov. 20, 1968 17 Sheets-Sheet 1

INVENTORS
RICHARD L. JARVIS
WALTER KULLY
BY Fay, Sharpe and Mulholland
ATTORNEYS INVENTORS
RICHARD L. JARVIS
WALTER KULLY
BY Fay, Sharpe and Mulholland
ATTORNEYS INVENTORS
RICHARD L. JARVIS
WALTER KULLY
BY Fay, Sharpe and Mulholland
ATTORNEYS INVENTORS
RICHARD L. JARVIS
WALTER KULLY
BY Fay, Sharpe & Mulholland
ATTORNEYS INVENTORS
RICHARD L. JARVIS
WALTER KULLY
BY Fay, Sharpe and Mulholland
ATTORNEYS INVENTORS
RICHARD L. JARVIS
WALTER KULLY
BY Fay, Sharpe and Mulholland
ATTORNEYS

AIRPLANE TOOLING

Original Filed Nov. 20, 1968

INVENTORS
RICHARD L. JARVIS
WALTER KULLY
BY
Fay, Sharpe & Mulholland
ATTORNEYS

AIRPLANE TOOLING

INVENTORS
RICHARD L. JARVIS
WALTER KULLY
BY Fay, Sharpe & Mulholland
ATTORNEYS

INVENTORS
RICHARD L. JARVIS
WALTER KULLY
BY Fay, Sharpe & Mulholland
ATTORNEYS

INVENTORS
RICHARD L. JARVIS
WALTER KULLY
BY Fay, Sharpe & Mulholland
ATTORNEYS

INVENTORS
RICHARD L. JARVIS
WALTER KULLY
BY
Fay, Sharpe & Mulholland
ATTORNEYS

AIRPLANE TOOLING
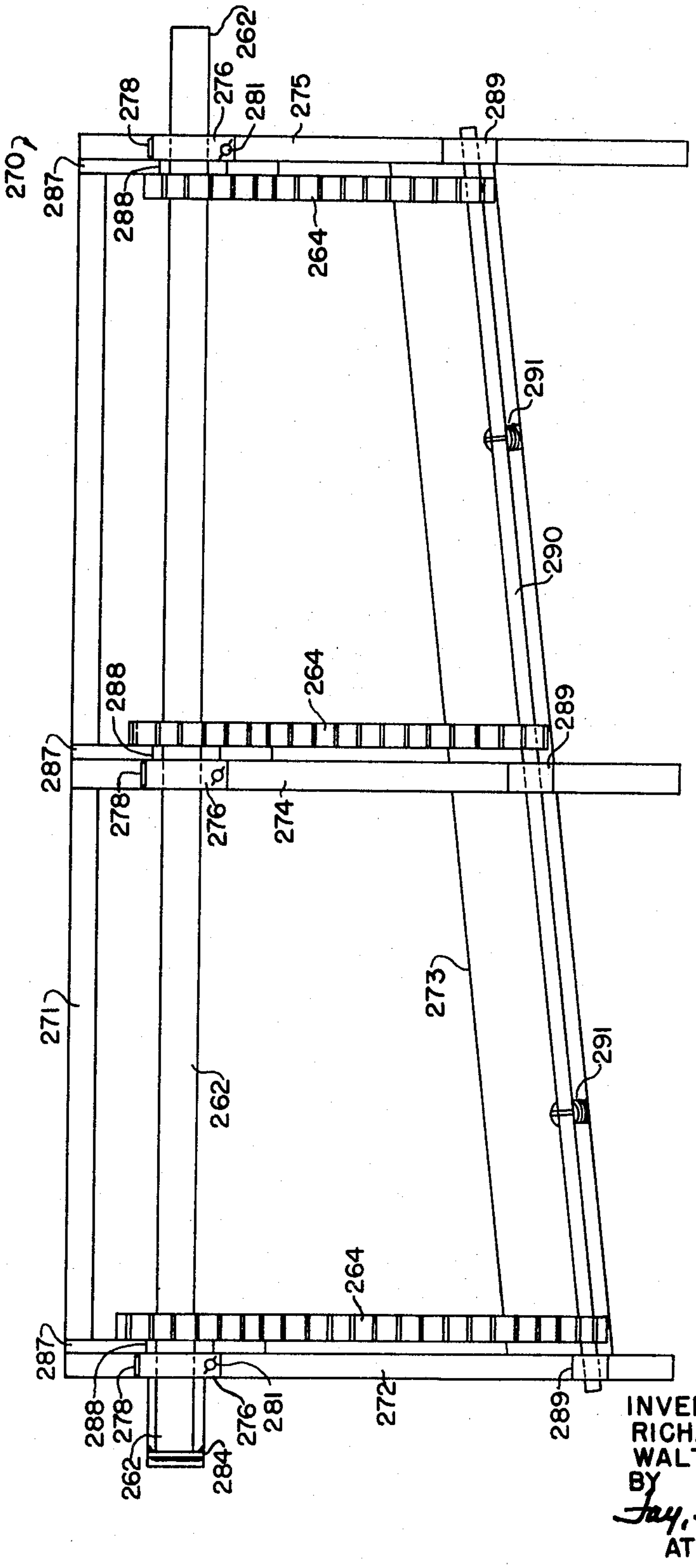
FIG. 23
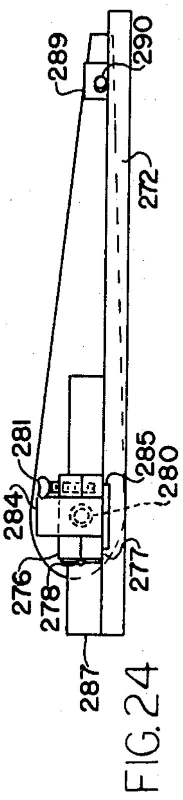
INVENTORS
RICHARD L. JARVIS
WALTER KULLY
BY
Fay, Sharpe & Mulholland
ATTORNEYS INVENTORS
RICHARD L. JARVIS
WALTER KULLY
BY
Fay, Sharpe & Mulholland
ATTORNEYS INVENTORS
RICHARD L. JARVIS
WALTER KULLY
BY
Fay, Sharpe & Mulholland
ATTORNEYS June 13, 1972 R. L. JARVIS ET AL 3,669,811

AIRPLANE TOOLING

Original Filed Nov. 20, 1968 17 Sheets-Sheet 16

INVENTORS
RICHARD L. JARVIS
WALTER KULLY
BY
Fay, Sharpe & Mulholland
ATTORNEYS

INVENTORS
RICHARD L. JARVIS
WALTER KULLY
BY
Fay, Sharpe and Mulholland
ATTORNEYS United States Patent Office 3,669,811
Patented June 13, 1972

3,669,811
AIRPLANE TOOLING
Richard L. Jarvis, 24258 Gessner Road, North Olmstead, Ohio 44070, and Walter Kully, 2290 Tripplet Blvd., Akron, Ohio 44312
Original application Nov. 20, 1968, Ser. No. 777,362, now Patent No. 3,616,075, dated Oct. 26, 1971. Divided and this application May 21, 1970, Ser. No. 48,606
Int. Cl. B30b 3/04, 15/34
U.S. Cl. 156—583 6 Claims

ABSTRACT OF THE DISCLOSURE

Briefly, the invention relates to jigs for placing aircraft component parts in assembled relationship and providing the pressure to bond them into a stressed skin construction.

A generic concept to the invention is the use of selectively actuated pressure applying surfaces over the areas to be bonded while the parts are held in their proper relative locations.

One portion of the invention relates to the bonding of an upper after fuselage section comprising flanged bulkhead sections and stringers and a stressed skin thereover in a single-stage jig having fluid expansible diaphragm over each of the areas to be joined, the fluid expansible diaphragms being in one-half of a jig which is pinned together to hold each of the bulkhead stringer and skin components in proper relation while providing a reaction force upon the application of the bonding pressure by means of the introduction of pressure into the diaphragms.

A second portion of the invention relates to the construction of a skeleton of a wing having a main tubular spar and a trailing edge spar with flanged ribs of stamped metal, the jig including supports for the ribs and spars, individual resistance heating means for applying heat and pressure at each of the joints of the wing skeleton. The second-stage jig for bonding the skin to the wing skeleton includes means for tensioning the skin over the skeleton as well as fluid pressure expansible means to provide the bonding pressure in all areas where the skin is bonded to the ribs and spars. The ribs of the wings have flanges into which transitory reinforcing means closely fit to prevent deflection of the flanges under the bonding pressure applied thereto, a transitory reinforcing means being segmented such that they may be pulled out through cutouts in the ribs of the wings after the bonding operation is completed.

A further portion of the invention relates to bonding of a plurality of ribs and a torque tube of an aircraft control element in assembled relation by means of a liquid epoxy resin in a tube cradle and rib clamping jig which maintains the parallel relationship of the ribs at a fixed angular and lateral position with respect to the tube.

The invention provides, in the second stage in the creation of a bonded aircraft control element, a jig which has pivoted contoured arms to clampingly engage the skin in areas in register over the ribs and trailing edge such that the areas to be bonded receive the proper bonding pressure. This pressure is supplied by means of a fluid pressure expansible means and manifold system connected thereto.

In addition to the air frame, wing and control element jigs, the invention includes a jig for bonding a frame member for an airplane cutout to the periphery of the cutout which is a transitory self-supporting jig having opposing members which may be moved into and out of clamping engagement with the margin of the skin defining the cutout by means of screw means connecting the two opposing members. The opposing pressure applying surfaces of the two members include at least one fluid pressure expansible means for application of the proper bonding pressure and a brief description.

BACKGROUND OF THE INVENTION

This appliction is a division of United States patent application Ser. No. 777,362, filed Nov. 20, 1968, now Pat. No. 3,616,075, issued Oct. 26, 1971.

This invention relates to light airplanes tooling and its use. Heretofore, small aircraft structures have been constructed using monocoque and semi-monocoque construction and a multitude of rivets to fasten the skins and bulkheads together. The bonded stressed-skin type of construction has been used for fuselage, wing and control element construction of larger airplanes; but, because of the difficulty and expense of providing the necessary tooling for properly locating the assembled parts and applying the required bonding pressures at the multitudes of joint locations therebetween, it has not been widely adopted in light airplane manufacture. As a consequence, most light airplanes of recent years have been of riveted or mechanical construction.

The present invention is a breakthrough in the economic use of bonded stressed-skin construction for the manufacture of light airplanes on a production basis. It is because of the novel tooling of this invention and its method of use that a light airplane of bonded stressed-skin construction can now be economically produced. Such an airplane is clearly superior to those having a riveted skin both because of its smooth rivet-free appearance and its reduced drag.

Briefly, one type of airplane to be constructed by the novel tooling and method of the invention is of a construction in which the lower portion of the fuselage is made up of a bonded honeycomb sandwich structure reinforced by thin metal strips and angles. The particular design of this type of aircraft includes the use of a "turtle-back" or unitary upper aft fuselage section having a stressed-skin construction bonded over a framework of thin metal bulkheads held in place by a central stringer.

The jig for the "turtle-back" portion of the fuselage has been provided such that two overlapped thin metal bulkhead sections are located and held firmly in place for bonding at a plurality of intermediate stations along the length of the jig. The aft bulkhead is of one piece. These are then tied together with a central upper stringer and the whole structure is uniformly bonded together with the metal skin stressed thereover in a single bonding operation.

A novel manner of providing a uniform bonding pressure and stressing the skin evenly over the bulkheads and stringer is provided. A thermosetting structural adhesive bonds the structural elements into a single rigid structure as they are held in proper assembled relationship by the novel tooling of the invention.

A tubular section projects entirely through the lower fuselage in such a manner that it provides for the connection and support of the wings at a proper dihedral angle. Each wing has a primary tubular spar which fits on the tubular section.

The wings and control surfaces of the airplane are also made of a bonded stressed-skin structure. The wing structure is primarily of a tubular spar construction having flanged thin transverse ribs with the stressed skin bonded thereto. A secondary channel-shaped spar joins the ends of the ribs adjacent the trailing edge. The control surfaces are similarly constructed utilizing single tubular spars and ribs. In the case of the wings, the ribs are made of flanged thin metal stampings, and in the case of the control surfaces, either stampings or honeycomb sandwich ribs of appropriate shape may be utilized.

Each of the airfoil structures is constructed in two stages: First, the skeleton is formed by assembling the ribs and the spars in an appropriate jig to accurately align and locate them. Then they are fixed in this assembled relation either by adhesive or mechanical fastening means. The skin is then stressed and bonded to the skeleton in a second jig designed to apply localized bonding pressures to the joints between the skin and ribs during the curing of the adhesive. These jigs have, over the areas of skin bonding to the skeleton, expansible pressure diaphragms which, after the two parts of the jig are clamped together, are inflated by fluid pressure to apply the necessary bonding pressure for the structural adhesive material being used. Special transitory reinforcing members to provide a reaction force and prevent distortion of the flanges during application of the bonding pressure are utilized. Provision is made in the wing jig for thermal expansion and contraction during the bonding operation. Examples of suitable adhesives for use are the types manufactured by Narmco Materials Division of Whittaker Corporation under the trademarks "Metlbond 225" and "Metlbond 328". Before bonding, all parts are surface prepared by treatment in a sulphuric acid sodium dichromate bath with an appropriate rinsing operation. These operations are performed prior to the assembly of the parts in the jig, and the parts are then carefully handled with cloth gloves to avoid contamination. The entire operation is performed in a controlled environment to further insure that the parts remain uncontaminated.

The "turtle-back" bulkhead section and stringers are set in a special single stage bonding fixture which is clamped with the skin laid thereover with all bonding points having 10 to 20 p.s.i. applied thereto. Thermocouples are attached to the structure at appropriate points and the jig is placed in the oven at a temperature of from 245° F. to 265° F. until all bonded joints are cured at 245° F. for 60 minutes. After the removal from the oven and a cooling down period, a complete inspection, including ultrasonic testing and mechanical testing of bonded specimens made simultaneously with the structure in the fixture, is performed. The control surface bonding operations are performed at the same temperature and pressure but, as stated before, in two stages, the first stage bonded rib and torque tube units being secured by means of an adhesive produced by the Minnesota Mining and Manufacturing Co., under the trademark "3M2214." This adhesive requires no pressure to perfect its bond.

The cutouts for the windows in the "turtle-back" portion are provided by means of a novel workpiece supported clamping fixture. In order to provide the frames about the window cutouts, the angular frame members of "L"-shaped cross-section are bonded to the periphery of the cutouts. The clamping fixture for this purpose has force-applying surfaces on the opposing faces of two separate jaw portions which are bolted in clamping engagement through the cutout with the marginal portion of the skin and the frame therebetween. At least one force-applying surface of the clamping fixture has a pressure expansible diaphragm member mounted in a groove thereof so that, after the fixture parts are bolted into place, air pressure may be introduced into the expansible diaphragm. This applies a uniform bonding pressure to all points of the adhesive joint between the skin and the frame.

BRIEF DESCRIPTION OF THE INVENTION

Briefly, the invention relates to jigs for placing aircraft component parts in assembled relationship and providing the pressure to bond them into a stressed skin construction.

A generic concept to the invention is the use of selectively actuated pressure applying surfaces over the areas to be bonded while the parts are held in their proper relative locations.

One portion of the invention relates to the bonding of an upper aft fuselage section comprising flanged bulkhead sections and stringers and a stressed skin thereover in a single-stage jig having fluid exapnsible diaphragm over each of the areas to be joined, the fluid exapnsible diaphragms being in one half of a jig which is pinned together to hold each of the bulkhead stringer and skin components in proper relation while providing a reaction force upon the application of the bonding pressure by means of the introduction of pressure into the diaphragms.

A second portion of the invention relates to the construction of a skeleton of a wing having a main tubular spar and a trailing edge spar with flanged ribs of stamped metal, the jig including supports for the ribs and spars, individual resistance heating means for applying heat and pressure at each of the joints of the wing skeleton. The second-stage jig for bonding the skin to the wing skeleton includes a means for tensioning the skin over the skeleton as well as fluid pressure expansible means to provide the bonding pressure in all areas where the skin is bonded to the ribs and spars. The ribs of the wings have flanges into which transitory reinforcing means closely fit to prevent deflection of the flanges under the bonding pressure applied thereto, a transitory reinforcing means being segmented such that they may be pulled out through cutouts in the ribs of the wings after the bonding operation is completed.

A further portion of the invention relates to bonding of a plurality of ribs and a torque tube of an aircraft control element in assembled relation by means of a liquid epoxy resin in a tube cradle and rib clamping jig which maintains the parallel relationship of the ribs at a fixed angular and lateral position with respect to the tube.

The invention provides, in the second stage in the creation of a bonded aircraft control element, a jig which has pivoted contoured arms clampingly to engage the skin in areas in register over the ribs and trailing edge such that the areas to be bonded receive the proper bonding pressure. This pressure is supplied by means of a fluid pressure expansible means and manifold system connected thereto.

In addition to the air frame, wing and control element jigs, the invention includes a jig for bonding a frame member for an airplane cutout to the periphery of the cutout which is a transitory self-supporting jig having opposing members which may be moved into and out of clamping engagement with the margin of the skin defining the cutout by means of screw means connecting the two opposing members. The opposing pressure applying surfaces of the two members include at lease one fluid pressure expansible means for application of the proper bonding pressure.

BRIEF DESCRIPTION OF THE DRAWINGS

FIG. 23 is a plan view of the spar and ribs of the control surface of FIG. 20 in its first-stage bonded jig.

FIG. 24 is an end elevation view of the structure of FIG. 23.

PREFERRED EMBODIMENT

Figure 1:
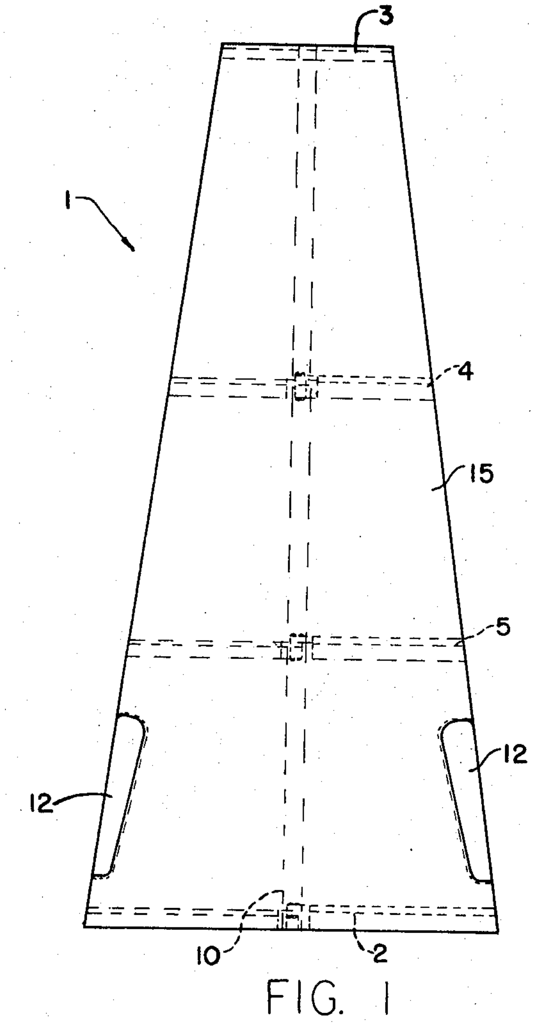
FIG. 1 represents a plan view of the upper aft fuselage assembly or "turtle-back" of a light airplane constructed using the tooling and method of this invention.
Figure 2:
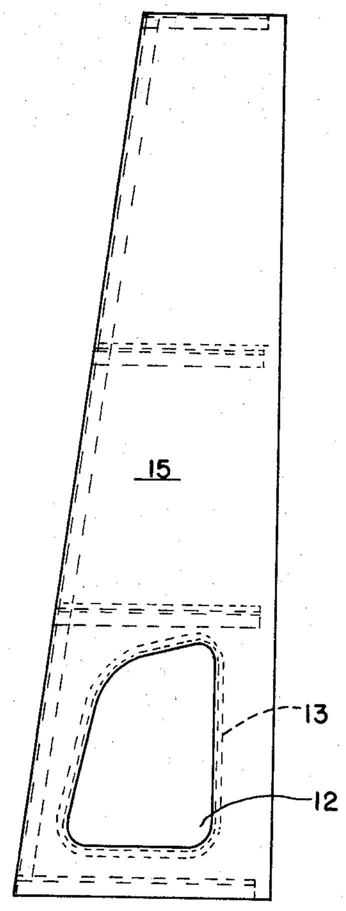
FIG. 2 represents a side elevation view of the "turtle-back" of FIG. 1.
Figure 3:
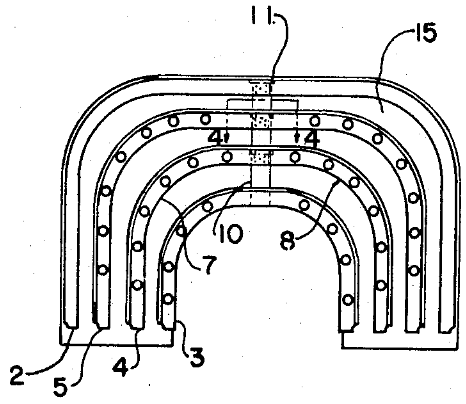
FIG. 3 represents a front elevation of the "turtle-back" of FIG. 1.
Figure 4:
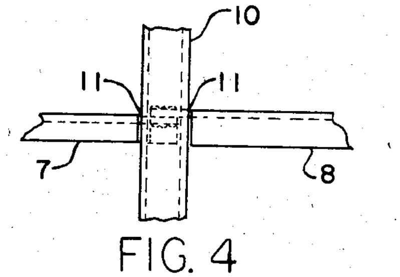
FIG. 4 represents a fragmentary view taken along the line 4—4 of FIG. 3 with portions of the parts broken away for clarity.

In the embodiment of the invention illustrated in the drawings, the numeral 1 generally designates the upper aft fuselage assembly or "turtle-back." The "turtle-back" 1 is of semi-monocoque construction having front and rear flanged metal bulkheads 2 and 3, respectively, and intermediate bulkheads 4 and 5. Bulkheads 4 and 5 are made in two flanged sections as best shown in connection with FIG. 4 with a left-hand section 7 overlapping the right-hand section 8 at the inner ends thereof. A channel-shaped stringer 10 interconnects the bulkheads 2, 3, 4 and 5. Notches or slots are provided in the overlapping inner ends of the bulkhead sections making up bulkheads 4 and 5 to permit passage of the legs of the channel-shaped stringer 10 therethrough in a manner more clearly seen in FIG. 4. The stringer 10 overlaps the bulkheads 2 and 3 and is bonded thereto for rigidity of the semi-monocoque structure. At the same time, an aluminum skin 15 of 0.020 inch thickness, for example, is bonded under heat and pressure to the stringer 10 and the peripheral flanges of bulkheads 2, 3, 4 and 5. In a separate operation to be described later the "turtle-back" is provided with windows 12 on either side thereof which are framed by a bonded metal member 13 having an angular cross-section.

The bulkheads, stringer and skin are assembled and bonded under pressure in the jig shown in FIGS. 5 through 10. The lower half of the "turtle-back" bonding jig is generally designated by the numeral 16. The jig is generally designated by the numeral 16. The jig 16 has a pair of horizontal support members 18 upon which a plurality of upstanding bulkhead support members 20 are located. The flanged bulkheads 2, 3, 4 and 5 are located in proper position with their peripheral flanges resting on the top edges of support members 20. They are held in place by toggle clamps 22.

The toggle clamps 22 are of a conventional type having a projecting manually operated lever 23 of a general L-shaped structure. The lever 23 is pivotally connected at the junction of the two legs of the "L," **23*a* and 23*b* respectively, to a link 24. At the end of the leg 23*b*, opposite the exposed manually operated leg 23*a*, is a pivotal connection with a clamp base member 26. The link 24 is in pivotal engagement with the force applying arm 27 which is, in turn, pivotally mounted on the clamp base member 26. Projecting from the arm 26 is the force-applying pad 28 which engages the bulkheads and bulkhead sections to hold them in place on supports 20. Bolts 29 secure the base 26 of the clamp to the support 20**.

Figures 8, 9, 10:
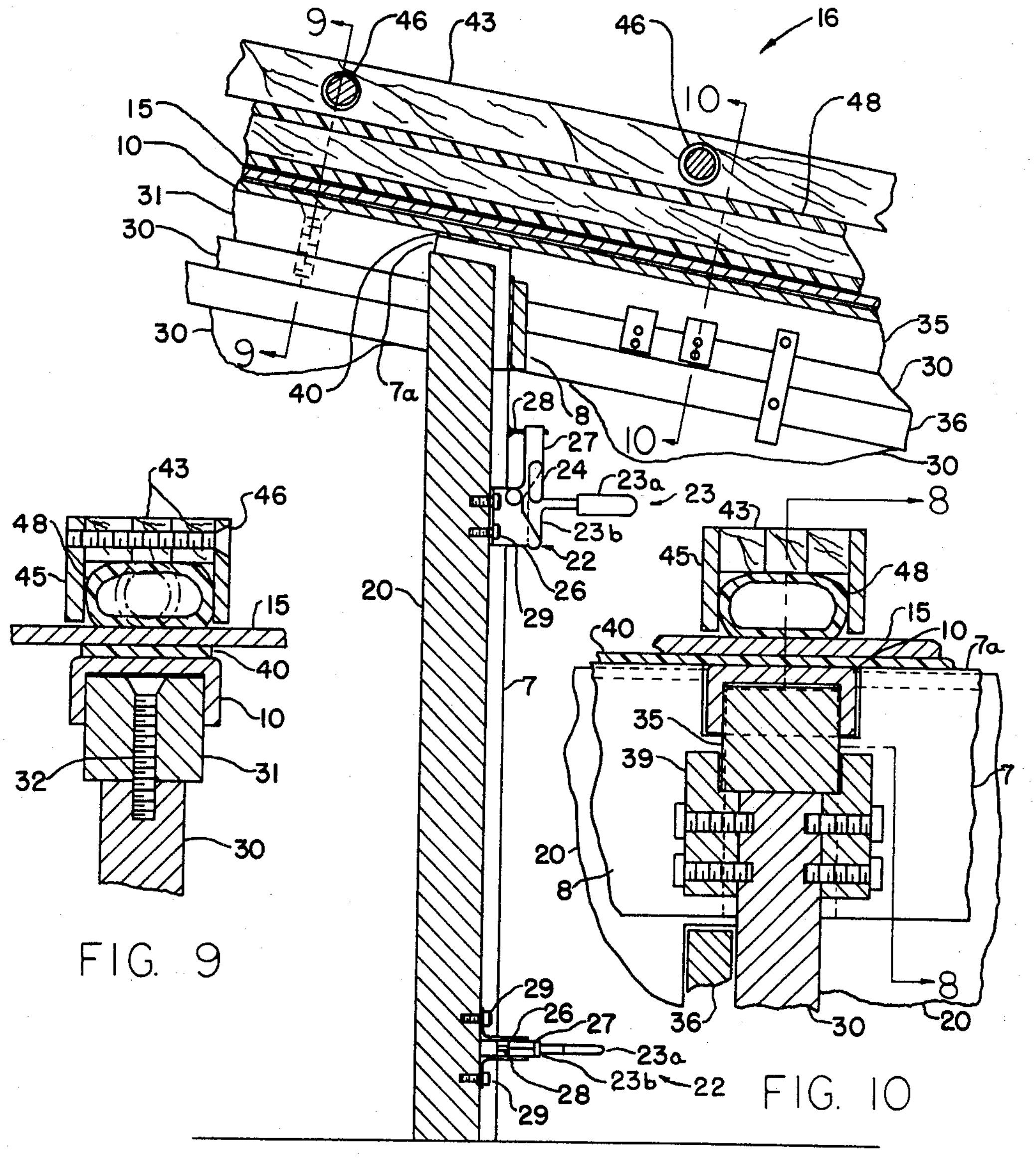
FIG. 8 is an enlarged detailed cross-sectional elevation view of the assembled "turtle-back" jig of FIG. 7.
FIG. 9 is a cross-sectional view taken along the line 9—9 of FIG. 8 during the application of fluid pressure.
FIG. 10 is a cross-sectional view taken along the line 10—10 of FIG. 8.

A view of FIG. 8, for example, will illustrate the operation of the clamp 22. By moving lever 23 upwardly about the pivotal connection of the leg **23*b* to the base 27, a clamping force will be applied to clamp the flanged bulkhead sections 7 and 8 in place on the bulkhead support 20 of the jig 16. The force will be removed upon movement of the lever 23** in the opposite or downward direction.

Each of the upstanding support members 20 is reinforced and held in position by an intermediate plate member 30. This plate member assures alignment of the top portions of the upstanding support members 20. Along the top of the plate member 30, a novel stringer support and clamping mechanism is provided.

This mechanism comprises fixed blocks 31 fastened to the top edge of the plate 30 by means of bolts 32. There is one fixed block for each bay between bulkhead support members 20. Each of the fixed members 31 have a forwardly extending tapered nose portion 33. Adjacent each of the tapered nose portions, and tapered in a complimentary shape, is a movable segment portion 35 for association with the fixed member 31. Relative longitudinal motion between movable member 35 and a fixed member 31 produces an upward movement of the member 35. The longitudinal motion is created by a manually operated actuator 36 tied by links 37 to each of the movable members 35. A plurality of blocks 39 fastened to the top edge of the plate 30 projecting upwardly therefrom define a channel for each of the movable members 35 to maintain them in alignment with their respective fixed members 31 during longitudinal movement. Thus, it will be seen that movement of the actuator 36 by means of longitudinally pushing it at its end projecting beyond the front bulkhead support 20 until a notch 34 engages support 20 will create longitudinal movement in the movable members 35 such that they will ride up on their respectively associated tapered nose portions 33 of the fixed members 31. This upward motion is utilized for the clamping pressure on the stringer after the top half of the jig is fastened in place in a manner which will become more apparent later in the description.

Figures 5, 6:
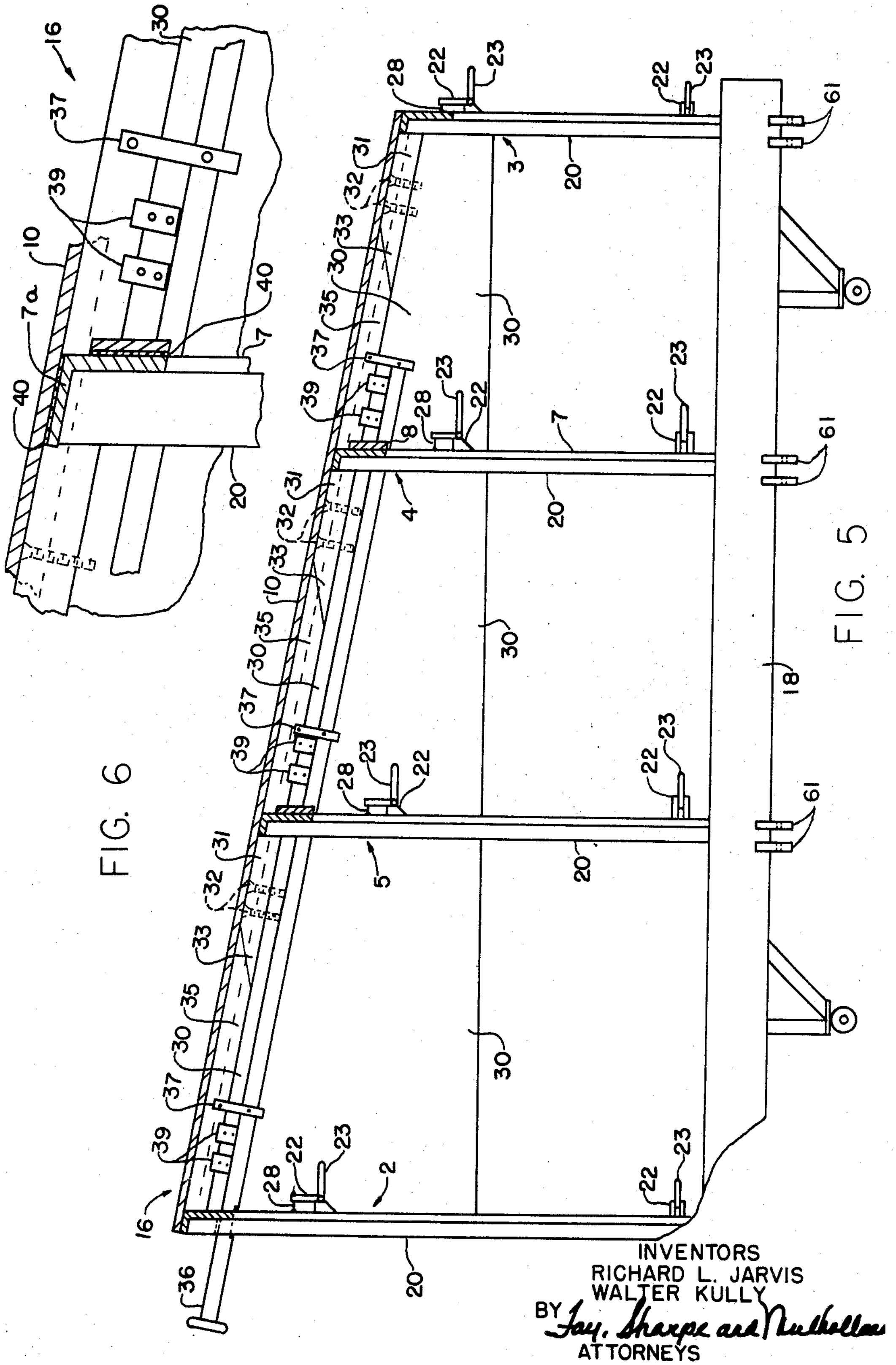
FIG. 5 represents a cross-sectional side elevation view of the lower portion of the "turtle-back" jig with the bulkhead sections and skin in place thereon.
FIG. 6 is an enlarged detailed view of a portion of FIG. 5.

In FIG. 5, the channel can be seen in place over the clamping and supporting mechanism made up of the fixed portions 31 and movable portions 35. It will be obvious that an appropriate opening in each of the three forward bulkhead sections 20 is provided for passage of the actuator 36 as well as the support plate 30 if it is constructed in one piece. In addition, it should be obvious that, in order for the channel to properly seat on the flange portions of the bulkheads and bulkhead sections, slots in the top of the upstanding bulkhead support members 20 must be provided to accommodate the legs of the stringer 10. Each of the bulkhead sections are clamped together in their overlapping face-to-face engagement by the force of the clamps 22. The adhesive 40 must be interposed between the overlapped surfaces. Generally, the adhesive material is tape supported and takes on a tackiness when lightly heated so that it will stay in place on the clean metal surfaces of the structural parts as they are being assembled in the jig. In a like manner, adhesive must be placed on the flanges where they engage the stringer prior to placement of the stringer on the stringer support and clamping members 31 and 35. Similarly, the areas of engagement with the skin on the top of the bulkhead flanges and stringer require the application of adhesive material as shown in detail in FIGS. 8 through 10.

Figure 7:
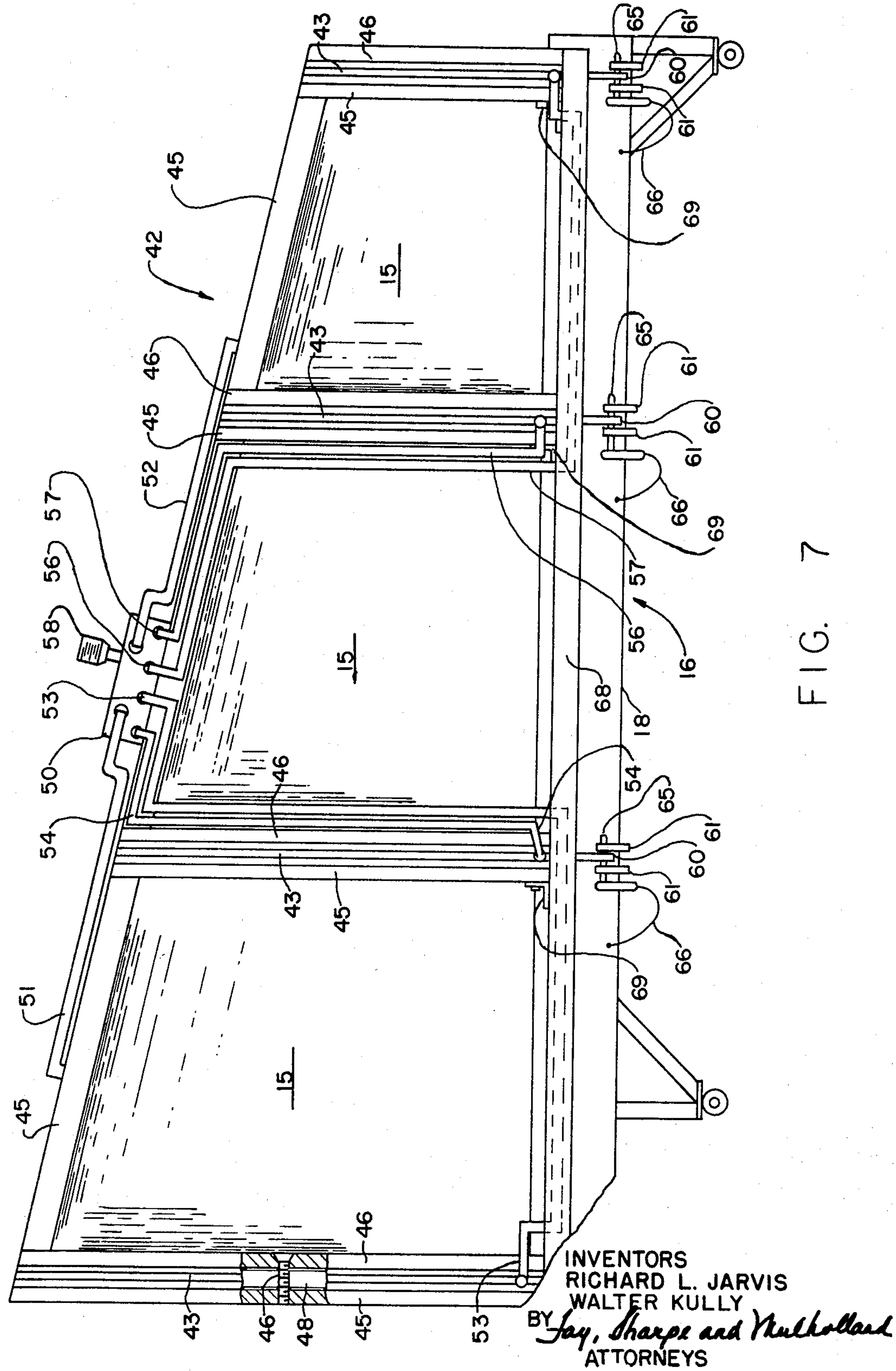
FIG. 7 is a schematic side elevation view of the "turtle-back" jig with the top portion assembled to the bottom portion and the skin and bulkheads in place for bonding showing the manifolding for the fluid expansible pressure diaphragms.

After the bulkheads, bulkhead sections and stringers have been laid out and clamped on the lower portion of the jig 16 and the adhesive material 40 tacked in place thereon, the skin 15 is placed over the skeleton defined thereby. The top jig portion, generally dsignated by the numeral 42, then is placed over the skin to clamp the bulkheads, bulkhead sections, stringer and skin between the jig 16 and the top jig 2 as shown in FIG. 7. The top jig 42 is made up of contoured channel-shaped structures which are complimentary to the shape of the bulkhead and stringers' outer contour.

The channel-shaped members as best seen in FIGS. 8 to 10 are made of wood laminates 43 with the leg portion of the channel shape being defined by metal strips 45. The entire laminated structure is held together by bolts 46. The channels, of course open toward the lower portion of the jig and have disposed therein silicon rubber hose sections 48 which expand under the application of the fluid pressure, preferably air pressure, thereto to the shape shown in FIGS. 9 and 10. As will be seen, upon the application of pressure and expansion of the hose 48, the skin 15 is clamped tightly to the stringer 10 and the bulkhead flanges. A manifold 50 is provided on the top central portion of the jig frame 42 to communicate air pressure to the various hose sections 48. For example, tube 51 supplies the forward portion of the hose 48 lying over the stringer 10, and tube 52 supplies the rearward portion. Because of the length of the jig structure, these two conduits both go to the single stringer clamping section of hose 48 adjacent the opposite ends thereof. This prevents a surge of pressure from applying an unequal load in any one section of the hose. It should be recognized that such a surge could shift the parts in the jig such that they would be bonded in misalignment.

Because of the structure of the jig 42, each bulkhead section is supplied with its own section of hose 48; and, as will be seen, a tube 53 supplies the front bulkhead hose and, in like manner, a tube 54 supplies pressure to the bulkhead section which clamps against the bulkhead 5. Tubes 56 and 57 correspondingly supply the pressure for the bulkheads 4 and 3 respectively. The bulkheads and bulkhead sections on the opposite side from that shown in FIG. 7 are similarly supplied from the manifold 50. The manifold 50 has a threaded coupling 58 which may be connected to a compressor or surge tank system supplying air pressure to various stations in the plant.

Upon the application of pressure to the hoses 48, a reaction force must be provided to prevent the top portion of the jig 42 from separating from the lower portion 16. For this purpose, a plurality of downwardly projecting ears 60 are provided at the outer ends of the bulkhead conforming laminated channel structures. The ears 60 extend downwardly and straddle the horizontal frame members 18 on either side of the jig portion 16 between pairs of projecting plates 61 welded or otherwise secured to the members 18. The projecting ears 60 of the top portion of the jig 42 and the projecting pairs of plates 61 on the bottom portion 16 of the jig have apertures which, before pressure is applied but after jig portion 42 is set over the skin onto the lower portion 16 of the jig, are placed in alignment. Locking pins 65, which are generally L-shaped for convenience, are inserted through the aligned holes to prevent the jig portions 42 and 16 from separating on the application of air pressure through the coupling 58 and manifold 50 into the hose sections 48. To prevent their being lost or mislaid and to keep them conveniently available, the pins 65 are attached by means of wires 66 to the adjacent portion of the horizontal support members 18.

It should be understood that the jig portions 16 and 42 are symmetrical about the longitudinal center line of the stringer 10 when all elements are assembled in position for bonding. The various laminated channel-shaped structures at the joints between the stringer backing and the bulkhead backing members of the top jig portion 42 are joined together by suitable gussets or flanged angle members which may be bolted or welded together. These have been omitted from the drawings for clarity of the invention.

The jig portion 42 has auxiliary horizontal channel members 68 secured to the bulkhead backing laminated channel-shaped structures to rigidly hold them in alignment. A representative manner of joining the laminated structures to these horizontal channel members 68 is shown in FIG. 7 in the structure backing bulkhead in the form of an angled strap means 69 which is welded to the horizontal channel 68 and bolted into the laminated structure 43 through the metal channel-defining leg 45. The entire jig, with the portions 42 and 16 pinned together and the hoses 48 inflated, is ready to be placed in the oven for bonding. For control purposes, thermocouples may be placed at strategic points to insure adequate heating and time at the required temperature. This control procedure, however, forms no part of the instant invention.

As previously stated, the wing structure is bonded in two stages. The first stage of bonding relates to the placement of the spars and flanged ribs in assembled relation to define a monocoque construction. The term "monocoque" is used even though the secondary spar acts almost as a stringer to keep the ribs adjacent the trailing edge in rigidly aligned relationship because there are no stringers per se in the structure.

Figure 11:
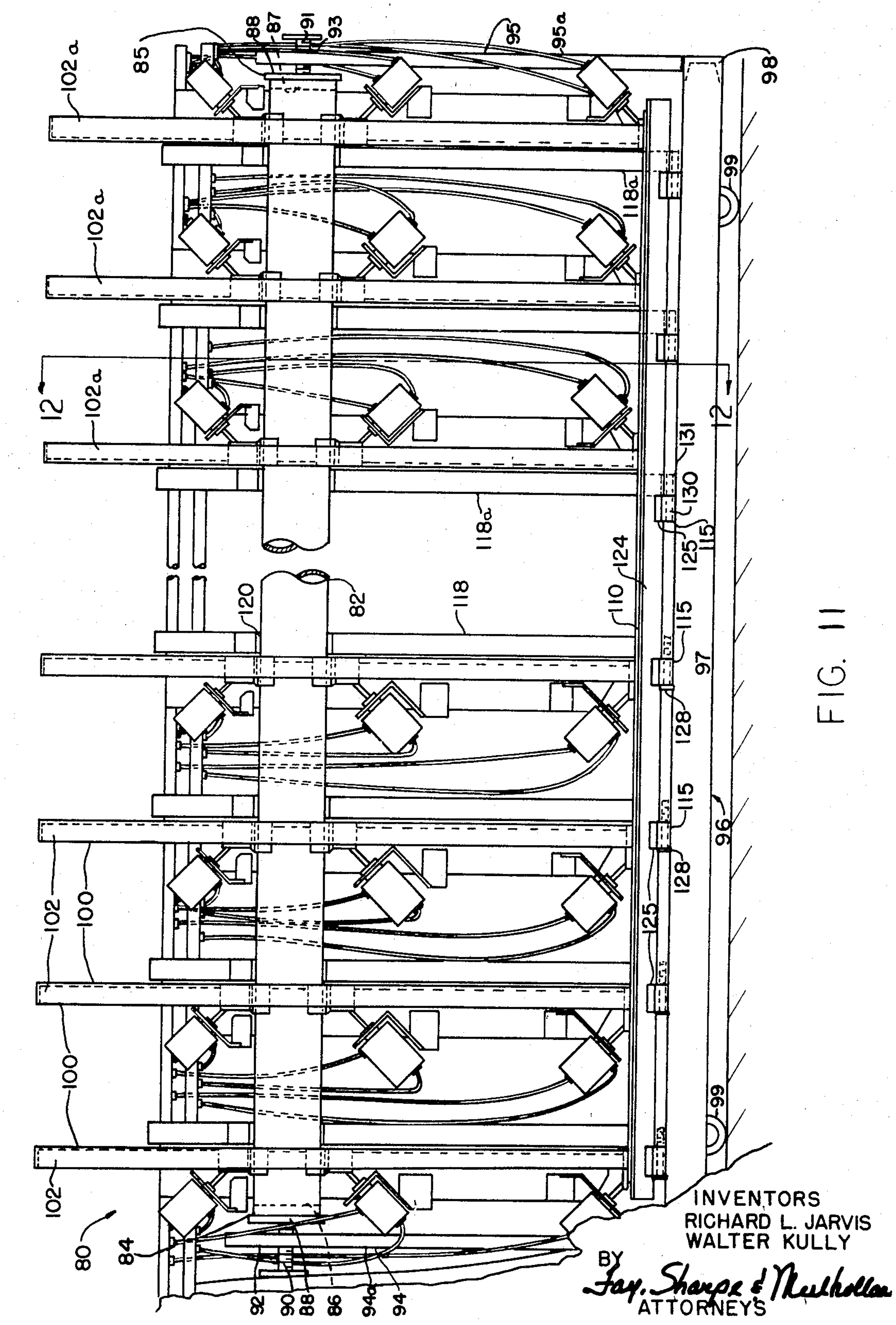
FIG. 11 is a side elevation view of the first stage bonding jig for the wing showing the spars and ribs in place.
Figure 12:
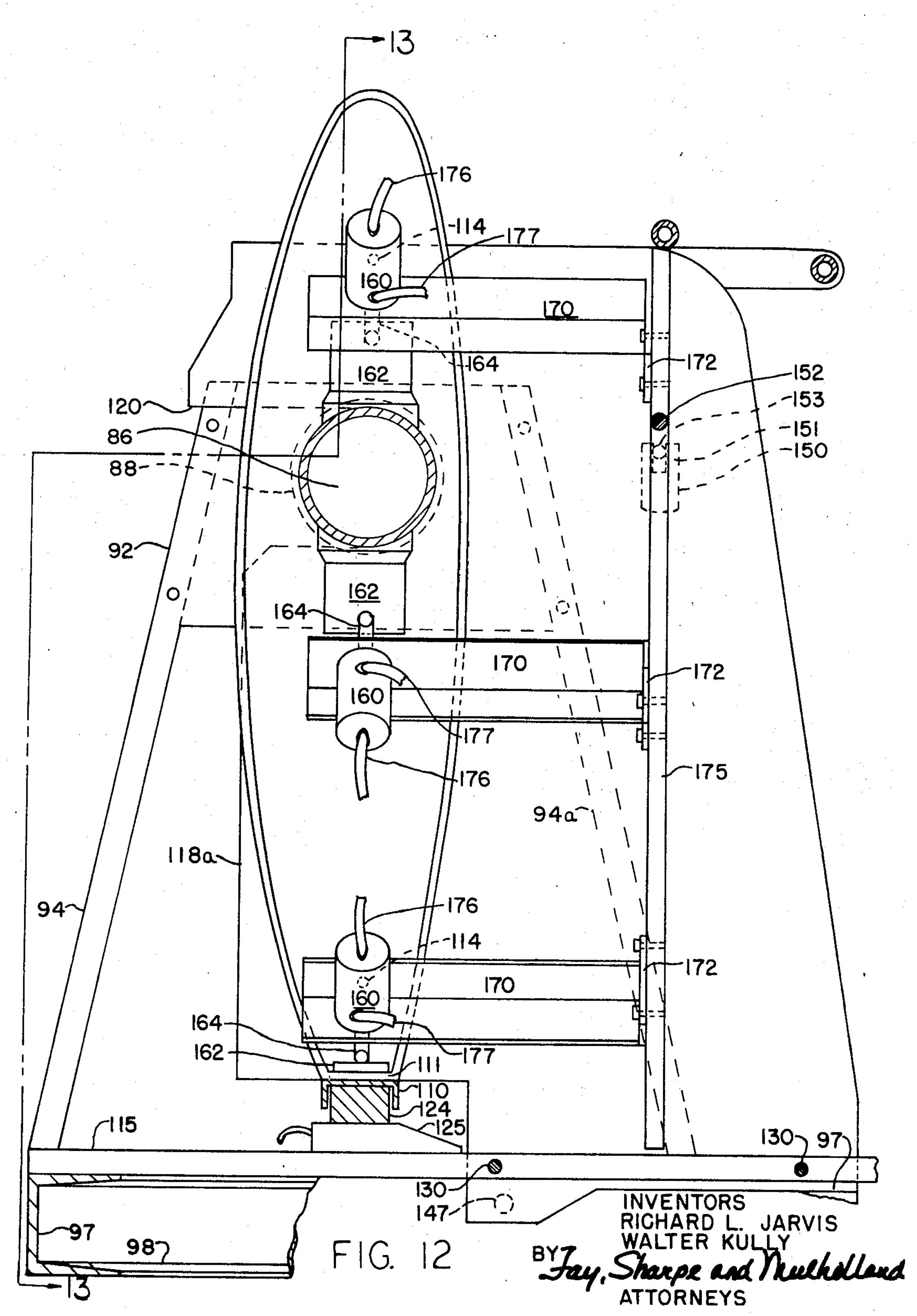
FIG. 12 is a cross-sectional elevation view taken along the line 12—12 of FIG. 11.

The first stage bonding jig for the wing is generally designated by the numeral 80, and is shown in FIG. 11.

The main wing spar 82 is of tubular aluminum structure and is held in proper aligned relationship in the jig 80 by means of two end supports 84 and 85 at its respective ends. The end supports 84 and 85 are of flanged cylindrical construction such that opposingly faced smaller diameter portions, 86 and 87 respectively, are telescopingly received in the opposite ends of the spar 82. The flanges 88 and 89 of the supports 84 and 85 abut the ends of the spar 82 when the smaller diameter portions 86 and 87 are inserted in the ends thereof to prevent lateral and longitudinal movement of the spar relative to the jig.

The spar supporting flanged cylindrical members 84 and 85 are mounted for horizontal advancement toward or away from each other on threaded shafts 90 and 91 respectively, which are in threaded engagement with end plates 92 and 93 respectively.

The end plates 92 and 93 are bolted or welded to upstanding end support legs 94 and 95 and their counterparts **94*a* and 95*a* on the opposite side of the jig from that shown in FIG. 11. The legs 94, 94*a*, 95 and 95*a* are rigidly secured as by bolting or welding to a jig base frame which is generally designated by the numeral 96. The base frame is a rectangular structure made up of four horizontal channel-shaped beam members which are welded, bolted or otherwise mechanically secured to form the rigid base of the machine. The longer channel-shaped beams 97 run longitudinally of the entire jig, and shorter end beams 98 define the ends of the rectangular frame 96. Suitable casters 99 support the frame 96** to facilitate movement of the jig into and out of the oven.

Spaced at appropriate rib stations along the length of the tubular spar 82 are a plurality of wing ribs 100. Any number of ribs required by the particular design may be used; and, for purposes of illustration, FIG. 11 has been broken to emphasize this. The wing ribs 100 have peripheral flanges 102 and spar engaging reinforcing members 104. The reinforcing members 104 are of an arcute shape having an "L"-shaped cross-section such that a portion thereof 105 is bonded to a side of the rib 100, and a flanged portion 106 is bonded to the spar 82. At the trailing edge of the ribs 100, a secondary spar 110 of channel-shaped cross-section is bonded by adhesive material 40 to a trailing or rear flange 111 of the rib 100. Appropriate cutouts 112 are produced in the individual ribs 100 to reduce the weight thereof. Suitable locating holes 113 are also provided in the ribs 100 for the receipt of locating pins.

Figures 13, 15:
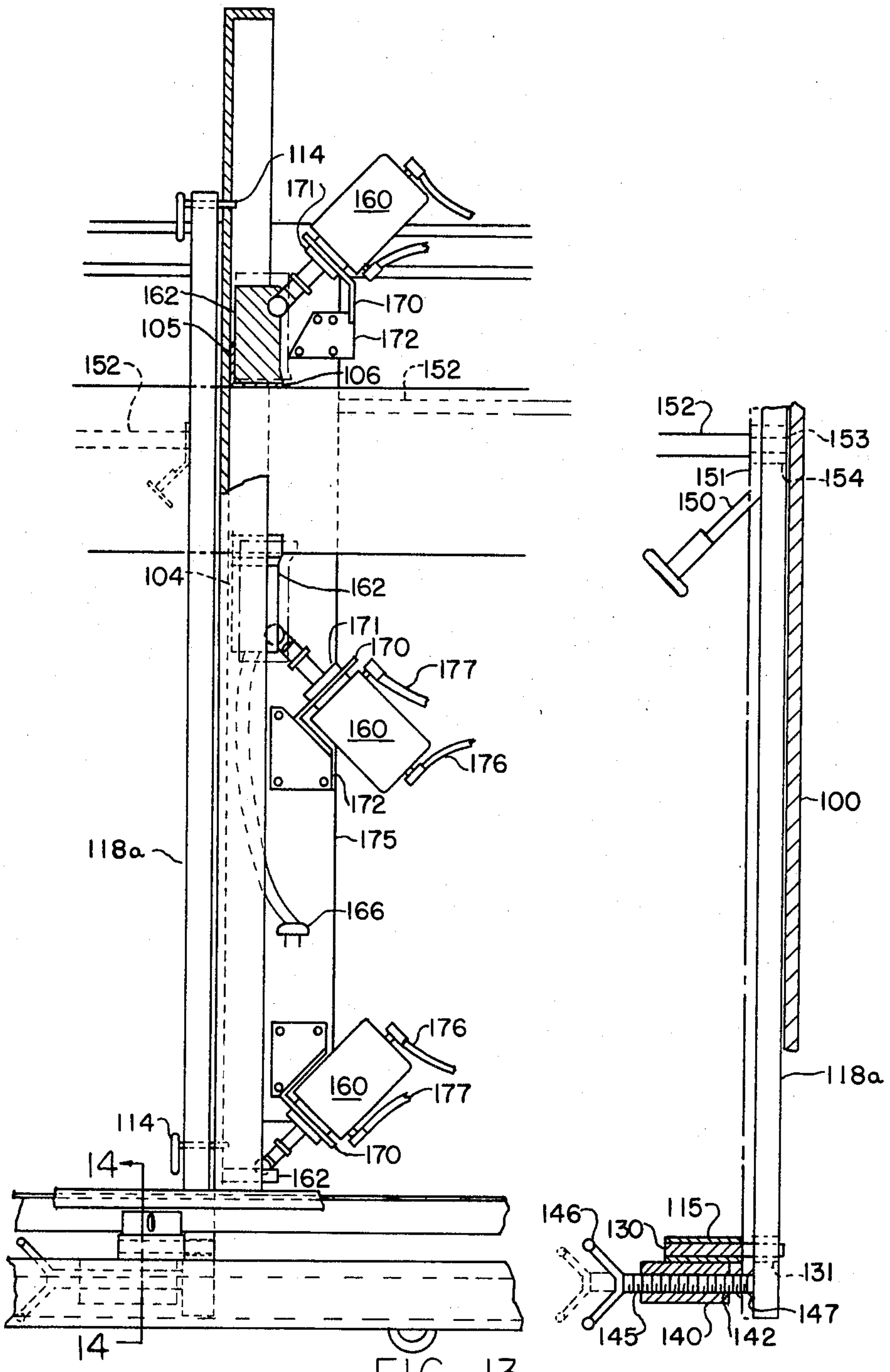
FIG. 13 is a detailed side elevation view taken along the line 13—13 of FIG. 12.
FIG. 15 is a detailed cross-sectional elevation view of a portion of FIG. 13 with certain other portions shown in FIG. 14 omitted for clarity.

Spanning between the longer horizontal beam members 97 of the base of the jig 80 and parallel to the end members 98 of the base frame are a plurality of transverse members 115. Each of the transverse members 115 has adjacent thereto an upstanding rib locating plate 118 or **118*a*. The rib locating plates 118 and 118*a* have large notches or cutouts 120 through which the spar 82 passes during movement laterally into and out of the jig and when being held by its end support members 84 and 85. The rib support plates 118 are spaced for engagement with the unflanged surface of each rib and have locating pins 121 projecting from apertures 122 therethrough for engagement in locating holes 113 of ribs 100. The direction of the flanges 102 of the ribs 100 is reversed at approximately the center of the jig so that one-half of the flanges 102 of the ribs extend in one direction, and approximately one-half of the flanges 102*a* of the other end of the wing extend in an opposite direction. This is required, of course, to insure that the end rib supporting plates 118*a*** can be moved axially along the spar as will be seen in connection with the description of FIGS. 13 and 15 to compensate for thermal contraction during cooling of the wing and fixture after the curing of the adhesive structural bonding material.

The secondary channel-shaped spar 110 is placed over a longitudinal jig member 124 which spans all of the transverse members 115 and extends from the outside of the edge of the flange of the rib 100 at one end of the wing to the outside of the flange of the rib 100 on the opposite end thereof and beyond. The channel 110 is straddled over the longitudinal support member 124, and wedge blocks 125 are located between the transverse members 115 and the channel support member of the jig 124. In this manner, the channel-shaped trailing edge spar 110 may be abutted against the rear flanges 111 of the ribs 100 with suitable bonding pressure therebetween after adhesive material 40 has been placed therebetween.

The transverse support members 115 each support the lower edges of an upstanding support plate 118 as seen in FIG. 11. The plates 118 and members 115 are secured to each other as by means of bolts 128 extending through aligned holes in the transverse members 115 and into threaded engagement with tapped holes through the plates 118. The transverse members 115 associated with the upstanding rib support plates **118*a* have apertures with pins 130 press fitted therein which project into bushings 131 molnted in holes along the lower edges of plates 118*a* with a sliding fit such that relative motion between the upstanding support plates 118*a*, and the transverse members 115 associated therewith, may be accomplished as the pins slide in the bushings 131 in the plates 118*a***.

Figure 14:
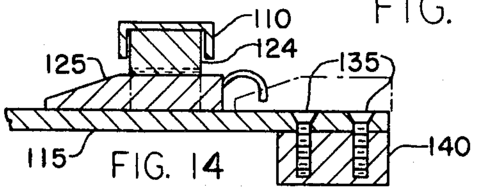
FIG. 14 is a fragmentary cross-sectional view taken along line 14—14 of FIG. 13.
Figure 16:
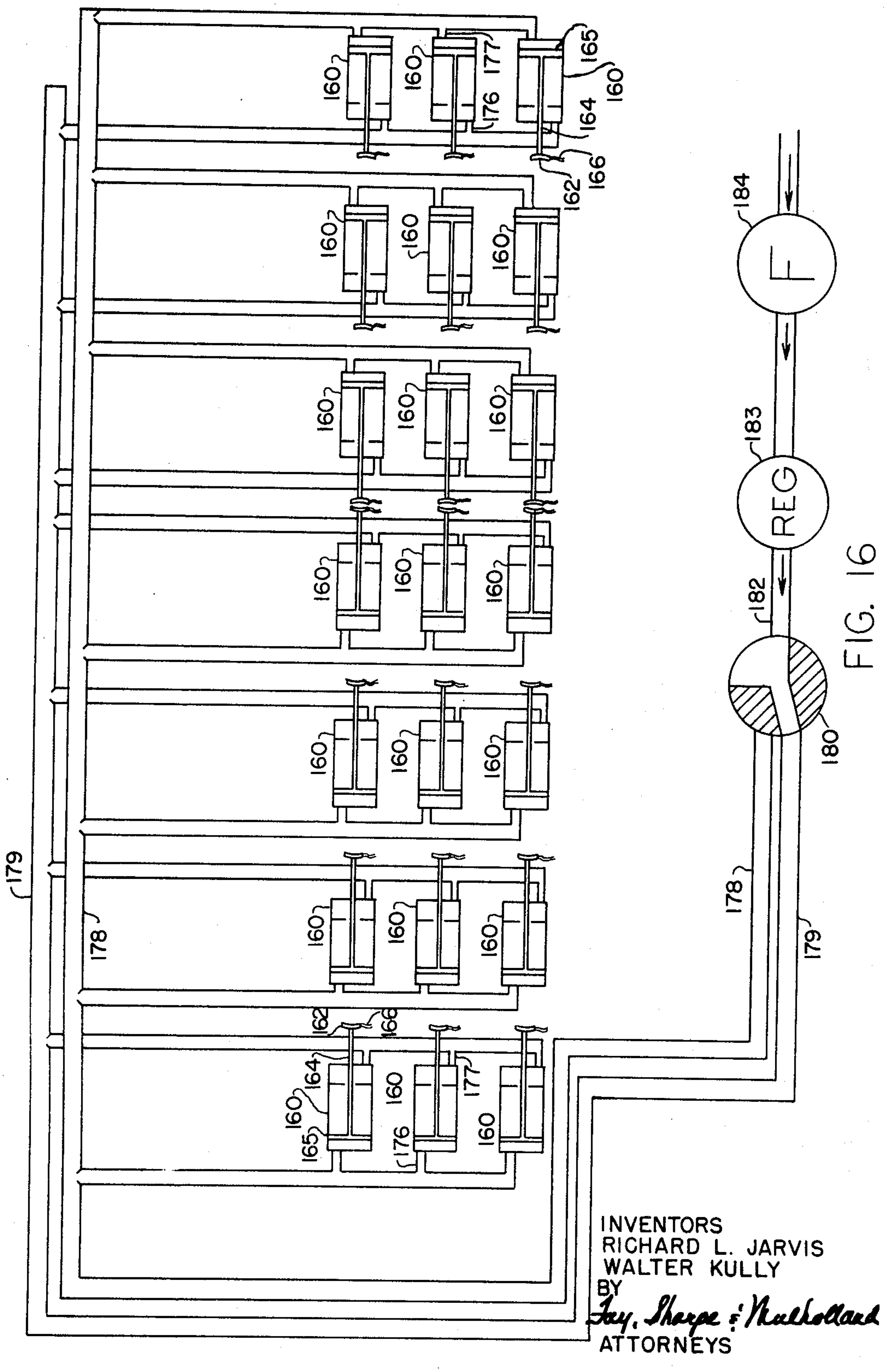
FIG. 16 is a schematic view of the fluid actuated heating clamps of the jig of FIGS. 11 to 15.

Immediately below the transverse members 115 and secured thereto by means of bolts 135 as seen in FIG. 14 is a reaction block 140. The reaction block 140 has a threaded aperture 142 for receipt of a threaded force applying member 145 therein. The threaded force applying member 145 has a torquing head 146 which includes two laterally projecting portions. On the end of the force applying member 145 opposite projections 146 is a force applying pad 147 which engages the lower edge of the movable rib support plate **118*a***.

This entire assembly makes up a thermal contraction compensating mechanism which operates as follows. Before the parts are assembled in the jig 80, the force applying member 145 is threadedly advanced within the block 140 to provide a space between the upstanding rib support **118*a* and the transverse member 115. This is, of course, accomplished by movement of the plate 118*a* on the pins 130**.

The top portions of the plates **118*a* are maintained in proper alignment when the force is applied against the lower edges of the plates 118*a* by means of feeler-type gauges 150. Each of the gauges 150 have a bifurcated end portion 151 which straddles a top support rod 152 spanning the bay between the plates 118*a*. The rod 152 has a reduced diameter portion 153 which is in a sliding fit engagement with a bushing 154 mounted in an aperture near the top of plate 118*a*. Thus, as will be seen in FIG. 15, plate 118*a* may assume a plurality of positions between the position shown in full and the point where the upstanding support plate 118*a* comes in engagement with the transverse member 115 as it rides along reduced diameter portion 153 of the rod 152 and the pins 130**.

Before the ribs, spars and reinforcing members are initially assembled on the jig 80 with the adhesive tacked between the surfaces to be bonded, the feeler gauge 150 is inserted in place adjacent the reduced diameter portion 153 and in the space between the shoulder it forms with the major portion of the rod 152 and the plate **118*a*. At the same time as the insertion of the feeler gauge 150, the threaded force applying member 145 is advanced to create an equal separation between the transverse member 115 and the lower end of the plates 118*a***.

With the jig in the fully expanded condition and the parts placed in properly assembled relation on the jig 80, the first stage bonding of the ribs and reinforcing members to the spars is performed. After this first stage bonding of the skeleton of the wing, the application of heat and pressure is ceased and the feeler gauge 150 is removed from its position. Thus, during cooling of the jig and bonded wing skeleton, the contraction of the wing parts and jig is taken up by relative movement between the plates **118*a* and their associated transverse members 115**.

As previously explained, each wing rib 100 has reinforcing members 105 bonded to the face of the rib and the main spar 82. The flanges 105 of the member 104 are in face-to-face bonded engagement with the surface of the rib and flanges 106 engage an arcuate portion of the spar 82 at opposite sides thereof. In order to apply the required bonding pressure to the reinforcing members 104, air cylinders 160 are provided which force pressure pads 162 against the reinforcing members 104 to hold them in tight engagement with the spar 82 and the ribs 100 with the adhesive bonding material therebetween. The pressure pads 162 are pivotally mounted on the ends of actuating rods 164 so they will pivot into the propert pressure-applying relationship when the air cylinders 160 are actuated. The actuating rods 164 are directly connected to double-acting pistons 165 within the air cylinders 160.

Each of the pressure pads 162 has an electrical resistance heating unit therein to supply necessary bonding pressure and heat simultaneously. Suitable electrical connection means 166 are provided for each of the heated pressure pads 162. The air cylinders 160 are held in orientation of approximately 45° to each of the joints with a spar by means of horizontal support arms 170. The horizontal arms 170 have apertures 171 through which the air cylinders 160 pass and are secured. Each of the arms 170 are welded to plates 172 which are in turn bolted to flanged plates 175 extending at right angles to the upstanding plates 118 and **118*a* at the rear margin thereof. The flange plates 175 also serve to reinforce the upstanding plates 118 and 118*a*** and prevent their becoming warped or buckled from repeated heating and cooling during operation of the jig.

Each of the air cylinders 160 has a forward motion-creating air hose 176 and a rearward motion-creating air hose 177. These hoses create air pressure within the cylinder 160 to reciprocate the pistons 165 alternately in forward or rearward direction to apply the clamping and unclamping force. The hoses 176 are connected by means of a manifold 178, and the hoses 177 are connected by means of a manifold 179. Each of these manifolds is, in turn, connected to a three-way valve 180. The valve 180 is connected to the source of air pressure 182 which has, in series, a pressure regulator 183 and filter 184 in a conventional manner.

Figure 17:
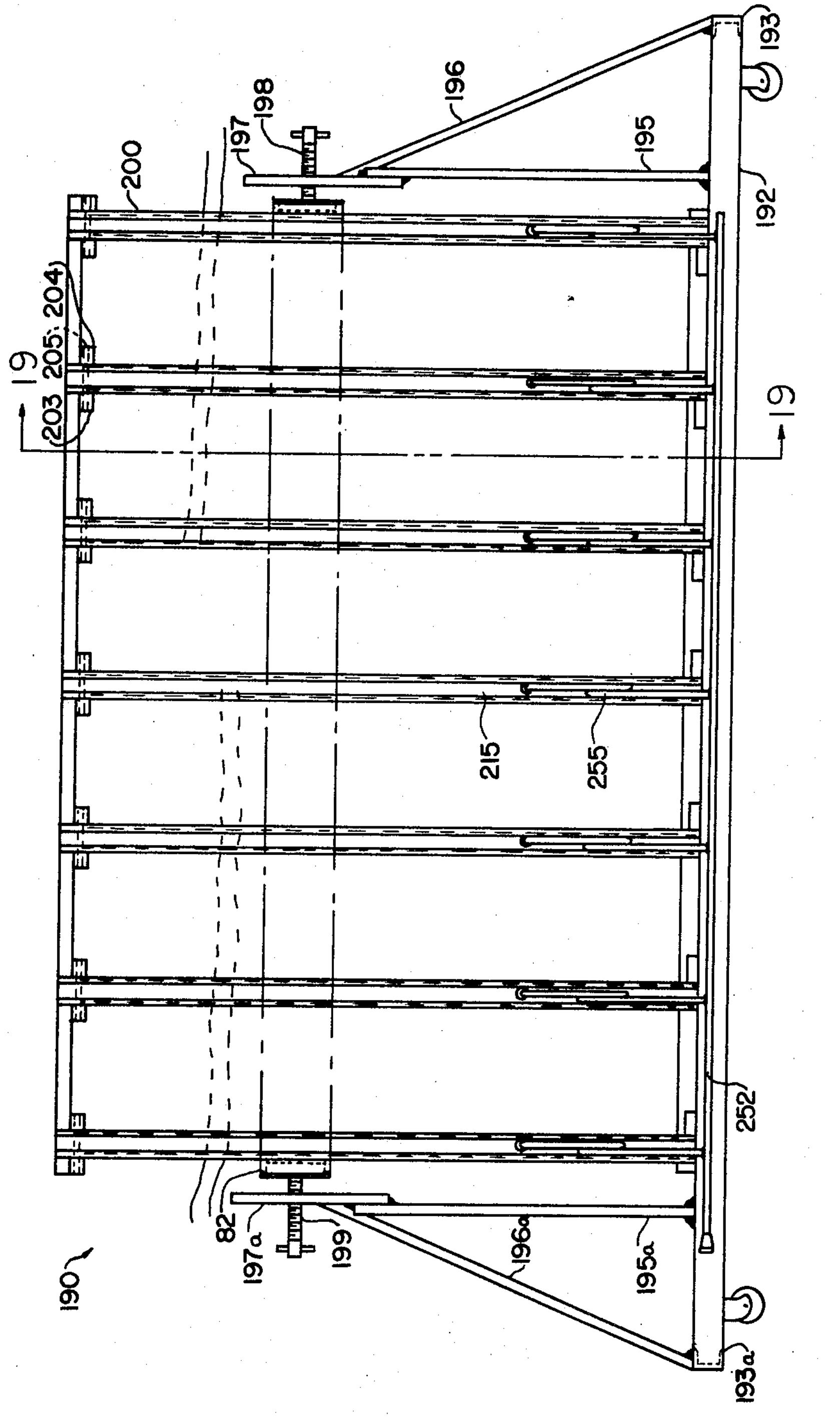
FIG. 17 is a side-elevation view of the second stage jig for bonding the wing with the skin and transitory reinforcing members in place.
Figure 18:
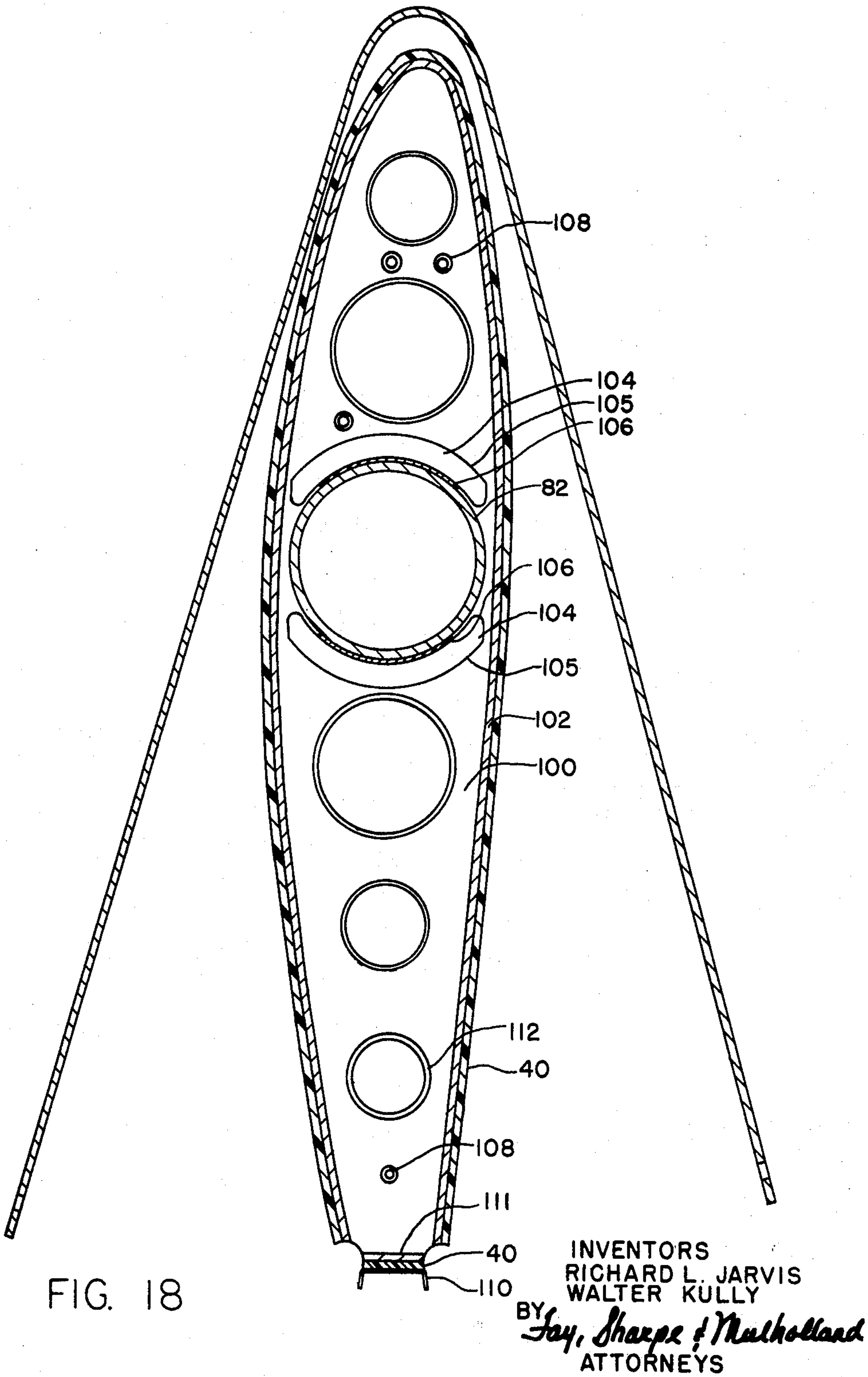
FIG. 18 is a cross-sectional elevation view of the monocoque wing structure of the invention prior to insertion in the jig of FIG. 17.
Figure 19:
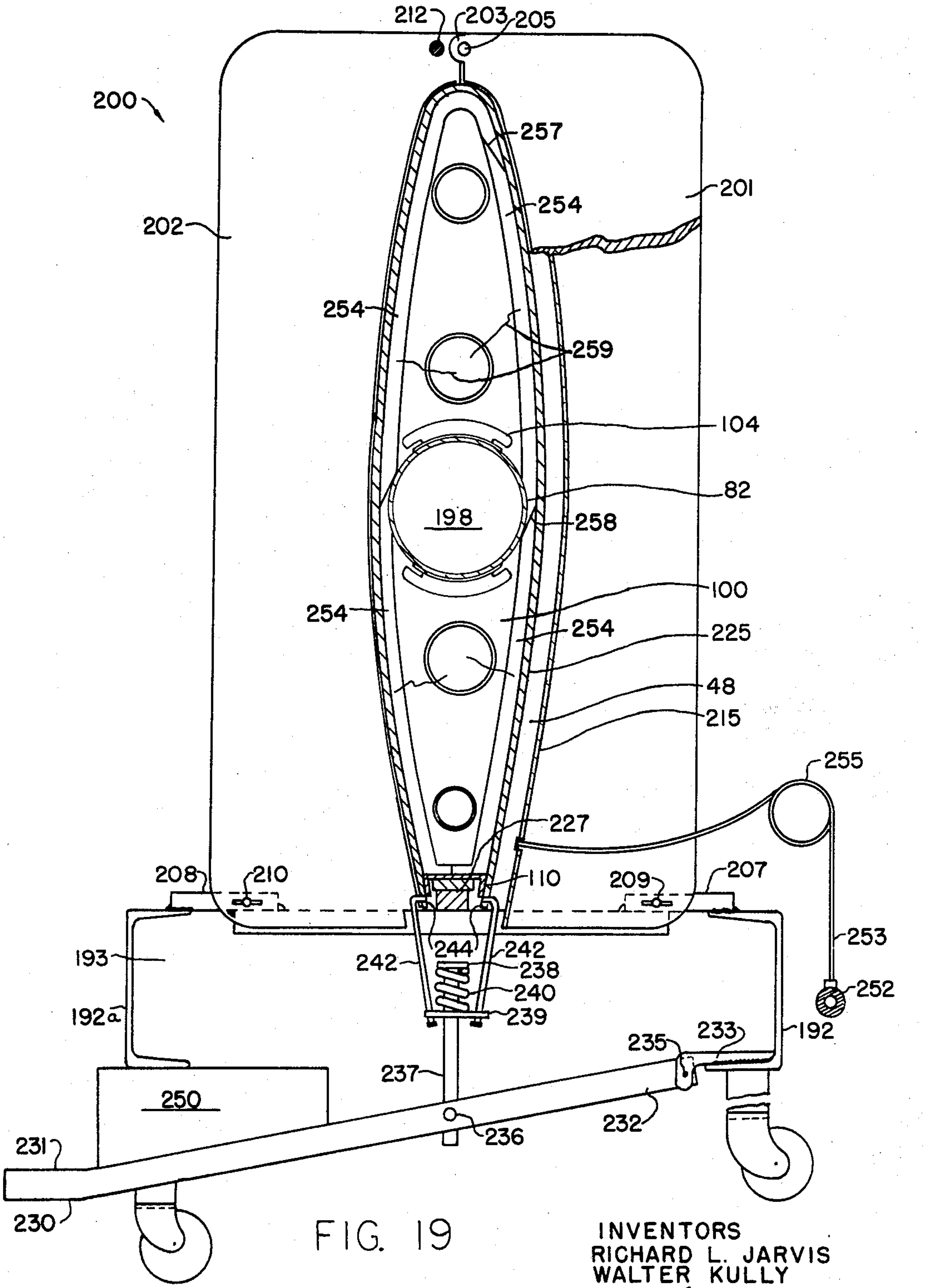
FIG. 19 is a cross-sectional elevation view taken along the line 19—19 of FIG. 17.

FIGS. 17 and 19 illustrate the second-stage bonding jig 190 for the wing. The jig 190 is made up of a rectangular frame having horizontal side members 192 and **192*a* interconnected by horizontal end members 193 and 193*a* with all of the horizontal members welded into a rigid rectangular frame structure. Upstanding from either end of the rectangular frame structure are vertically upstanding legs 195 and 195*a* and triangular brace members 196 and 196*a* in association therewith. Mounted at the top of this upstanding bracing structure are plates 197 and 197*a* having central threaded apertures therein for receipt of end support members 198 and 199, respectively, for supporting the open ends of the main spar 82 after it has been bonded together with a plurality of ribs 100 in the jig 80**.

The jig 190 has a removable hinge-top portion generally designated 200 made up of a plurality of hinged plates 201 and 202. The plates 201 and 202 are hinged as by means of projecting ears 203 and 204 which have apertures which align for receipt of a hinge pin 205. The bottoms of the plates, 201 and 202 respectively, lie adjacent to rib station alignment blocks 207 and 208 respectively which are welded or otherwise secured to the horizontal frame members 192 and **192*a* to brace and locate the lower edges of the plates 201 and 202. Locating pins 209 and 210 are provided for securing the plates in vertical position relative to the structure of the frame. A similar alignment function is performed by spacer rods 212 located at the top of the plates 202** to hold them in properly spaced relationship at their upper ends.

The plates 201 and 202 are each made up of two structural members in register with a channel-shaped member 215 contoured about the pressure- applying opening shape. The channel 215 contains the pressure-applying diaphragm or hose 48 for applying pressure to the wing skin in the area where it engages the flanges of the ribs 100. The bonding operation here is similar to that explained above in connection with the "turtle-back" insofar as materials and pressures involved are concerned. Thus, it will be seen that, in order to place the skin 225 in position to be bonded to the ribs and the flanges of the rear spar 110, the assembled ribs and spar structure are placed on end in the jig 190 over a long central horizontal support member 227 supported by the jig frame. The hinged plates 201 and 202 of the top jig portion 200 are then brought down over the skin 225 and the rib and spar skeleton of the wing.

Because of the stiffness of the aluminum skin material, a pull-down mechanism comprising a treadle member 30 is utilized. The treadle member 230 has a projecting end which is engaged by the foot of a workman, or otherwise, at a first end 231. At its opposite end 232, the treadle 230 has a pivotal connection which comprises an "L"-shaped member 233 welded to the horizontal frame member 192 such that a pin 235 may pivotally connect it to the treadle 230. Intermediate the force-applying end 231 and the fixed pivot point 235 is a pivotal connection 236 to a vertically upstanding link 237 which is headed at its upper end by means of a flange 238. The link 237 has, intermediate the flange 238 and pivot point 236, a second laterally extending member 239, telescopingly mounted thereon so as to provide opposite lateral projections and an aperture through which the link 237 is free to move lengthwise. A coil spring 240 is telescopingly mounted on link 237 between the flange 238 and member 239.

The transverse member 239 has headed hook-like structures 242 secured thereto with upstanding ends for hooking apertures 244 provided for this purpose in the skin 225. Thus, it will be seen that the skin can be tensioned down over the skeleton formed by the bonded structure of the ribs 100 and the spars 82 and 110 by pushing the ends of hooks 242 through the apertures 244 in the overlapping trailing edge of the skin 225 and depressing the treadle 230. By depressing the treadle 230, the flange 238 compresses the spring 240 against the transverse sliding member 239 to apply force in a downward direction as the end 231 of the treadle pivots about the pivot point 235 fixedly mounted to the frame member 192. After the correct amount of tensioning and stressing of the skin down over the skeleton structure, an appropriate holding means such as tapered block 250 is inserted to hold the treadle in the proper downward position. It is the skin tensioning in this manner which prevents sagging in the bays between the ribs of the skin during flight of the aircraft, thus preventing "oil-canning" of the skin during flight. This is extremely important in the structure of the airplane.

After the skin is pulled down over the wing skeleton structure, the hinged top portion 200 is brought down into position and pinned into place by means of locating pins 209 and 210 in the blocks 207 and 208. These pins then apply the reaction force such that, when the pressure is applied to a manifold 252, the air lines 253 supply the hose or expansible diaphragm 48 with the proper amount of pressure so that the bonding pressure at the point of the skin attachment to rib flanges is accurately provided. The tubing 253 is preferably provided with coils 254 therein to provide for hinged movement of the legs 201 and 202 without damage to the air conduits and couplings.

In order to prevent the distortion of the rib flanges during the application of the bonding pressure, transitory reinforcing members **225*a*, 225*b*, 225*c* and 225*d* in the form of thin metal members contoured such that they fit along the inside surface with each other of the flange around its periphery as well as against the periphery of the tube 82 and against the inside surface of the trailing edge spar 110. The transitory reinforcing members 225*a*, 225*b*, 225*c* and 225*d* abut each other as seen, for example, at 257 and 258 such that a force resisting deflection of the rib flanges is created thereby. After completion of the bonding operation, the transitory reinforcing members 225*a*, 225*b*, 225*c* and 225*d* are removed from the inner portion of the wing through cutouts 112 by means of wires 259** attached thereto.

Figures 20, 22:
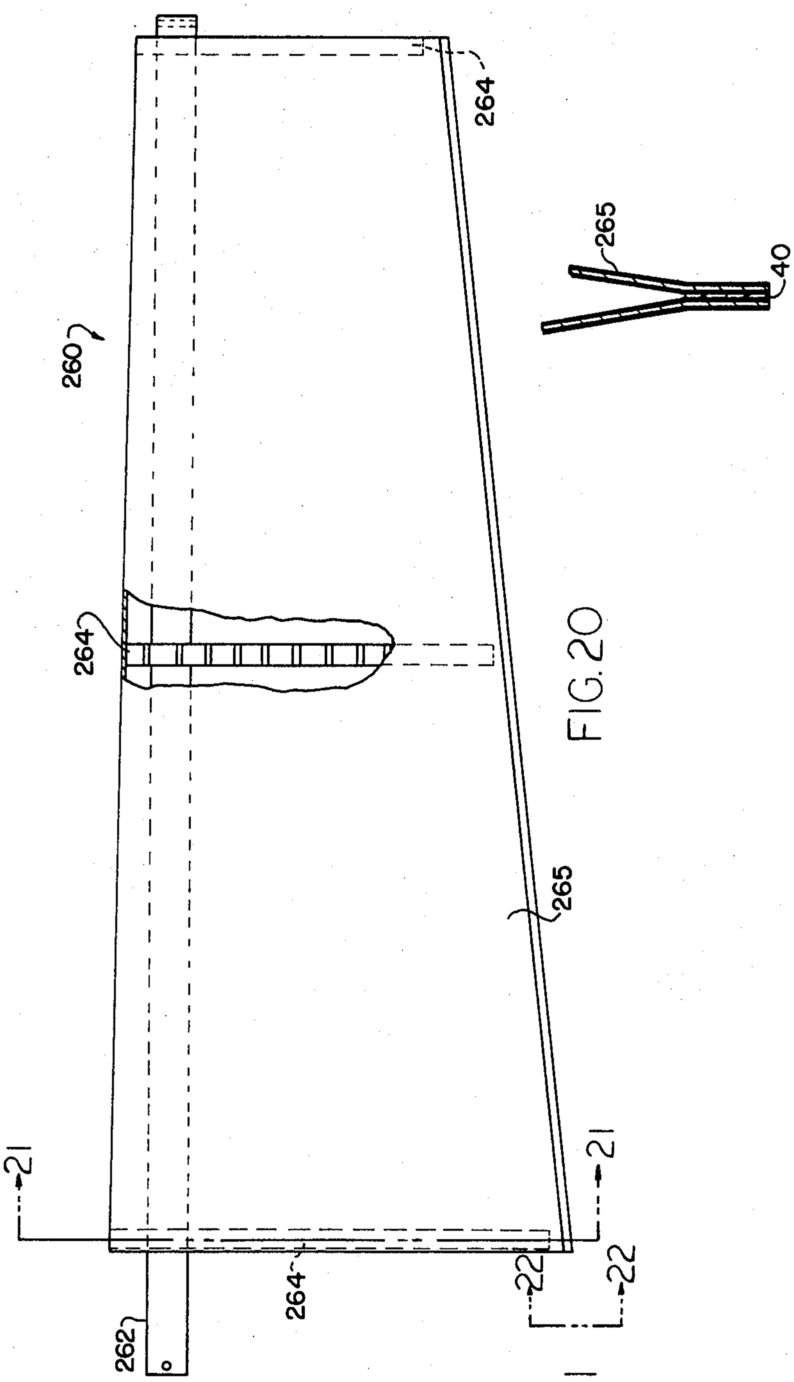
FIG. 20 is a plan view of a typical control surface.
FIG. 22 is a detailed cross-sectional view of the trailing edge of the control surface taken along the lines 22—22 of FIG. 20.
Figure 21:
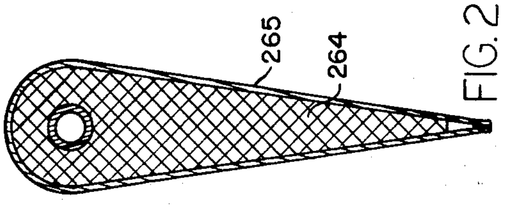
FIG. 21 is a cross-sectional view taken along the line 21—21 of FIG. 20.
Figures 25, 26:
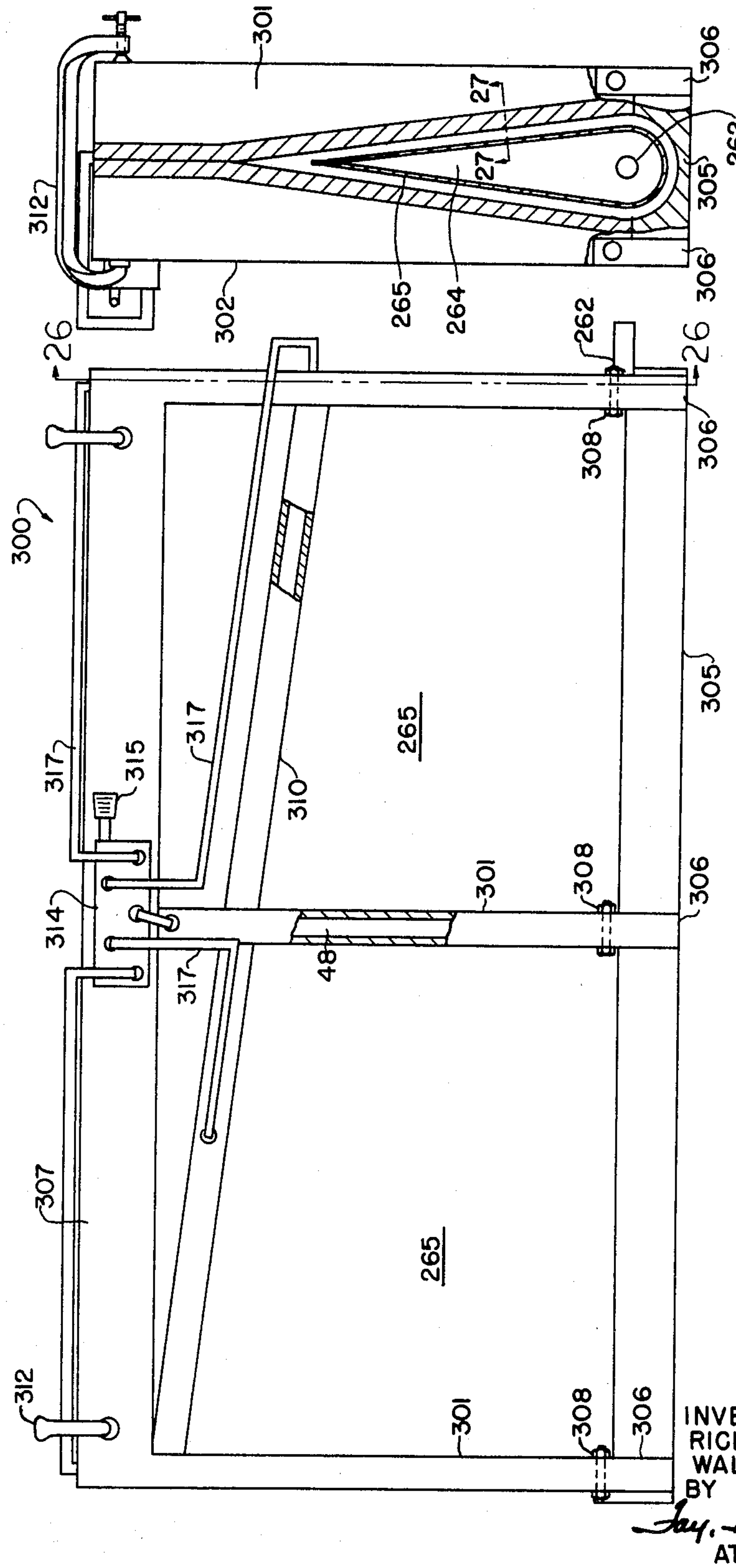
FIG. 25 is a top plan view of the second-stage bonding jig for the control element illustrated in FIG. 20.
FIG. 26 is an end elevation view of the structure shown in FIG. 25.
Figure 27:
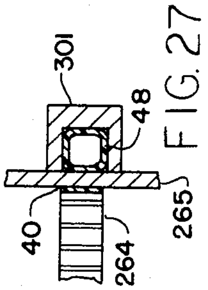
FIG. 27 is a fragmentary cross-sectional view taken along the lines 27—27 of FIG. 26.
Figure 28:
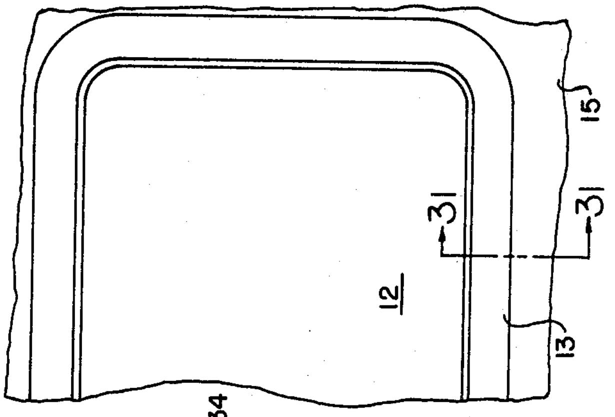
FIG. 28 is a fragmentary elevation view of a window in the "turtle-back" of FIGS. 1 to 3.
Figure 31:
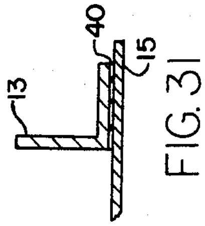
FIG. 31 is a cross-sectional view taken along the line 31—31 of FIG. 28.
Figure 30:
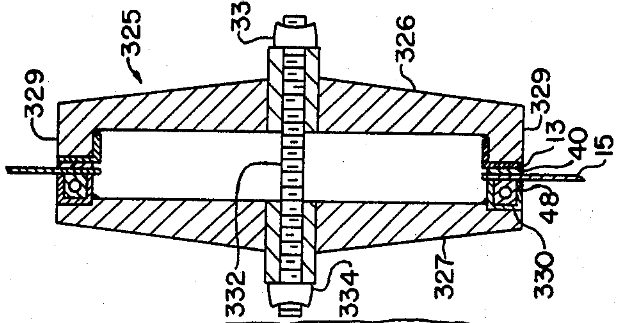
FIG. 30 is a cross-sectional view taken along the line 30—30 of FIG. 29.
Figure 29:
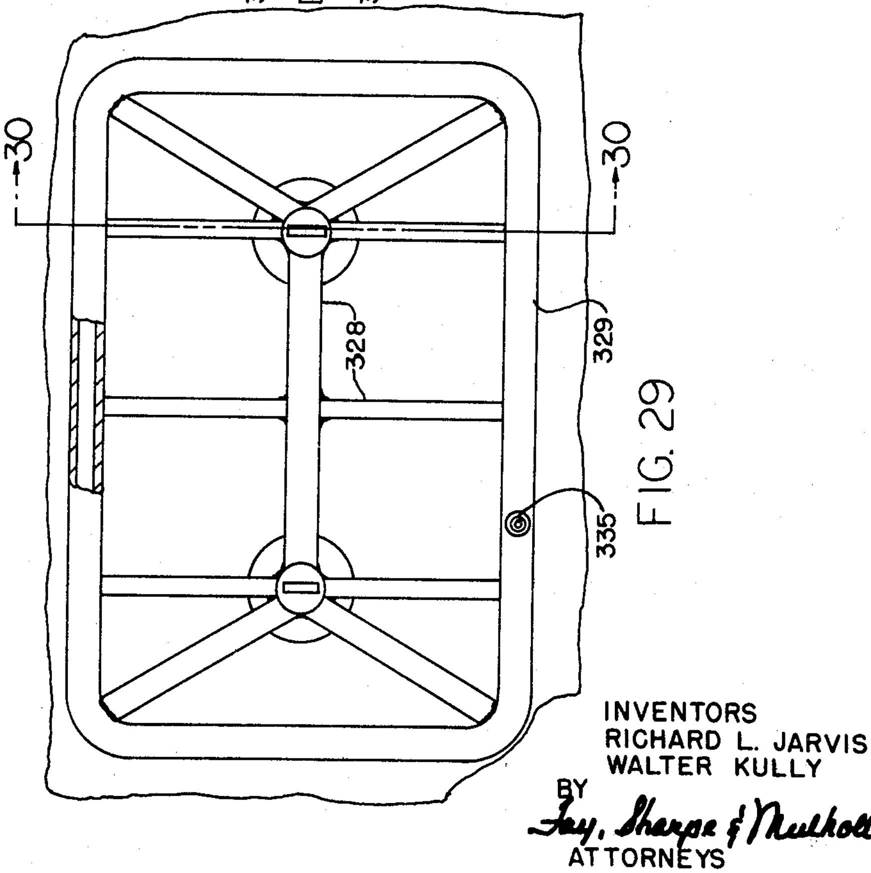
FIG. 29 is a side elevation view of the jig in place for applying the bonding pressure for the window frame illustrated in FIG. 28.

As previously stated, the ailerons, flaps, elevators and other control surfaces are also bonded in two stages. FIG. 20 is a typical control surface generally designated by the numeral 260. Control surface 260 is made up of a torque tube or rod member 262 having at appropriate locations therealong ribs 264. The ribs 264 are shown as honeycomb sandwich material; but, as previously stated, they may also be flanged aluminum stampings similar to the ribs 100 of the wings. The control surface 260 has a skin 265 which is wrapped around the leading end of the rib 264 and tapered backward to a trailing edge in a bonded joint as shown in FIG. 22, for example, with adhesive material 40 therebetween. Control surfaces which include trimtabs may be provided with a channel-shaped trailing edge spar to which a hinge may be riveted for connection of a trimtab in hinged relation thereto. Such structural detail of the airplane, however, forms no part of the present invention. It is merely stated for clarity as to the tooling and method of manufacture which is the subject of this invention.

The control surface 260 is made up initially in the first-stage bonding jig of FIG. 23. The first-stage bonding jig is generally designated by the numeral 270 and comprises a frame having a longitudinal leading edge support member 270 having affixed at the end thereof a transverse frame member 272 which is joined at its opposite end by an angled frame member 273 which follows the taper for the particular control element 260. The frame members 271 and 273 are also joined by intermediate frame member 274 and end member 275, which both are parallel to the frame member 272. Atop each of the parallel transverse frame members 272, 274 and 275 are a pair of hinged blocks having an upper half 276 and a lower half 277. The blocks are hinged by means of hinges 278. With the blocks 276 and 277 open, each block forms a semi-circular groove intermediate its ends which runs parallel to the longitudinal frame member 271. When the blocks 276 are superimposed over blocks 277, these grooves form an opening 280 in each of the pairs of half blocks 276 and 277 for receipt of the torque tube 262 of the control element skeleton. Torque tube 262 is held firmly in position by means of thumb screws 281 which hold the blocks 276 and 277 in clamping engagement therewith.

Before the torque tube 262 is placed in the blocks, ribs 264 are telescopingly received on the rod 262 through apertures 282 therethrough previously coated with a liquid adhesive material of the epoxy type known as "3M2214" made by the Minnesota Mining and Manufacturing Company.

When the torque tube 262 is placed into the jig 270, one end is inserted until it rests against an upward projection 284 supported by means of a plate 285 secured to frame member 272. This gives the lateral location of the torque tube relative to the jig 270. The ribs 264 are then moved axially along the torque tube 262 until they are each in face-to-face engagement with one of the three spacers 287 which are mounted to the sides of the frame members 272, 274, and 275 for this purpose. The spacers 287, of course, have suitable apertures 288 through which the torque tube passes when it is set into the jig. Also, on the rear of each of the transverse frame members 272, 274 and 275 adjacent the trailing edges of the ribs are mounted apertured blocks 289. The apertured blocks 289 are aligned on the respective frame members such that the locating rod 290 may be passed through locating apertures put into the rear of each of the ribs to hold them in alignment about the circumference of the torque tube 262 in the same relative angular position. To prevent any movement of the ribs relative to the torque tube during the bonding operation, coil springs 291 are provided on the frame 273 to engage and hold down the rod 290 and the rib ends through which it passes. When the ribs 264 and torque tube 262 are thus located in the jig 270, it is placed into the oven for the bonding operation.

After the first-stage bonding has been performed, the skeleton structure form thereby is placed in a second-stage bonding jig 300 with the skin 365 placed around the ribs 264 in an opening defined by hinged channel-shaped members 301 and 302 which are in opposing relation on opposite sides of a base member 305 at each of the rib locations. The base member 305 has laterally projecting ears 306 at either side thereof at the three rib locations such that bolts 308 therethrough hinge each of the channel-shaped members 301 and 302 outwardly from the base 305. The side channel members 301 and 302 form with with members 307 at the ends opposite base 305 a structure similar to that of a jig 200 for the wing and include therein a hose 48 within each of the channel sections. As will be seen, a tapered channel member 310, following the contour of the trailing edge of the control surface, is also provided in the rectangular framework. "C" clamps 312 or other convenient means may be utilized to clamp the jig 300 in its closed position around the skin and skeletal structure. A manifold 314, having an inlet coupling 315 and appropriate conduits 317, supply air pressure to the expansible diaphragm or rubber hose 48 over the trailing edge and the surrounding circumference of each of the ribs such that the proper bonding pressure may be provided at each of the points on the control element to be bonded. After the air pressure has been applied, the second-stage bonding fixture is then placed in the oven and the bonding of the skin to the ribs of the control surface is accomplished in a manner similar to that discussed in connection with the bonding of the wing skin to the wing skeleton.

FIGS. 28 to 31 illustrate a manner of utilizing the bonding technique of the invention in connection with making cutouts as, for instance, to provide windows 12 in the upper aft fuselage section or "turtle-back" 1. After the "turtle-back" has been bonded up with the skin stressed thereover, the opening to be provided in the skin is cut to the proper shape, and the frame 13 of "L"-shaped cross-section is placed about the margin of the properly cut out shape. At this point, a self-supporting clamping jig, generally designated 325, is secured through the cutout. The jig 325 has two opposing mirror-image halves 326 and 327. A bracing structure 328, which includes a central rib member and legs extending out to a peripheral pressure-applying projecting margin member 329 of the same as the cutout, makes up each half of the jig. The jig half 327 has, for its portion 329, a channel-shaped member 330 in which hose 48 is mounted for expanding to provide the proper pressure for bonding. The two half members of the jig, 326 and 327, are held together by bolts 332 having nuts 334 on either end thereof so that they may be tightened in clamping engagement to hold the angular cross-section frame members 13 against the skin 15 in face-to-face relation with bonding material 40 therebetween. With the jig thus being supported by the parts themselves in proper position, an air inlet coupling 335 is connected to the source of air pressure, and the expansible diaphragm or hose 48 is provided with air pressure to give the proper bonding pressure throughout the entire joint to be made between the frame and the stressed skin.

Figure 32:
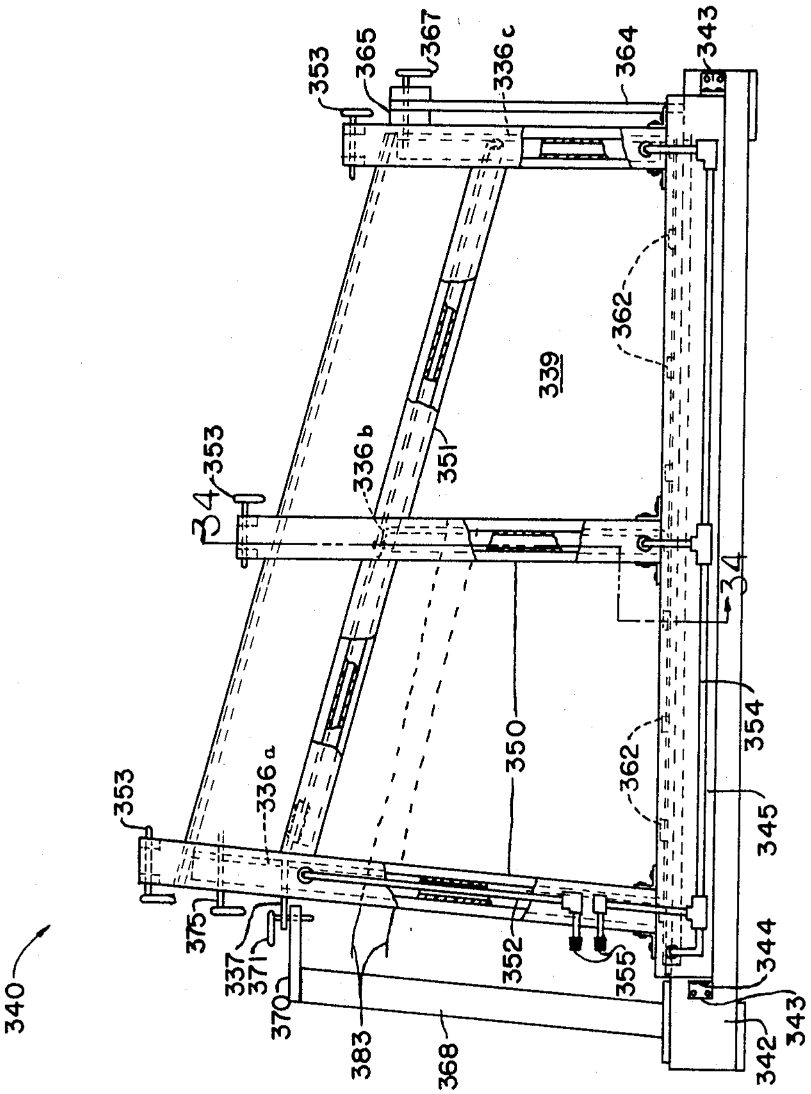
FIG. 32 is a side elevational view of the second-stage bonding jig for applying the skin to the riveted skeleton structure of a stabilizer or fin of the airplane with certain of the parts broken away for clarity.
Figure 33:
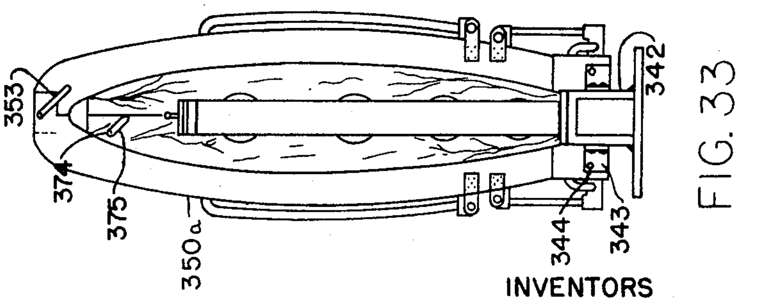
FIG. 33 is an end elevational view with structure of FIG. 32.
Figure 34:
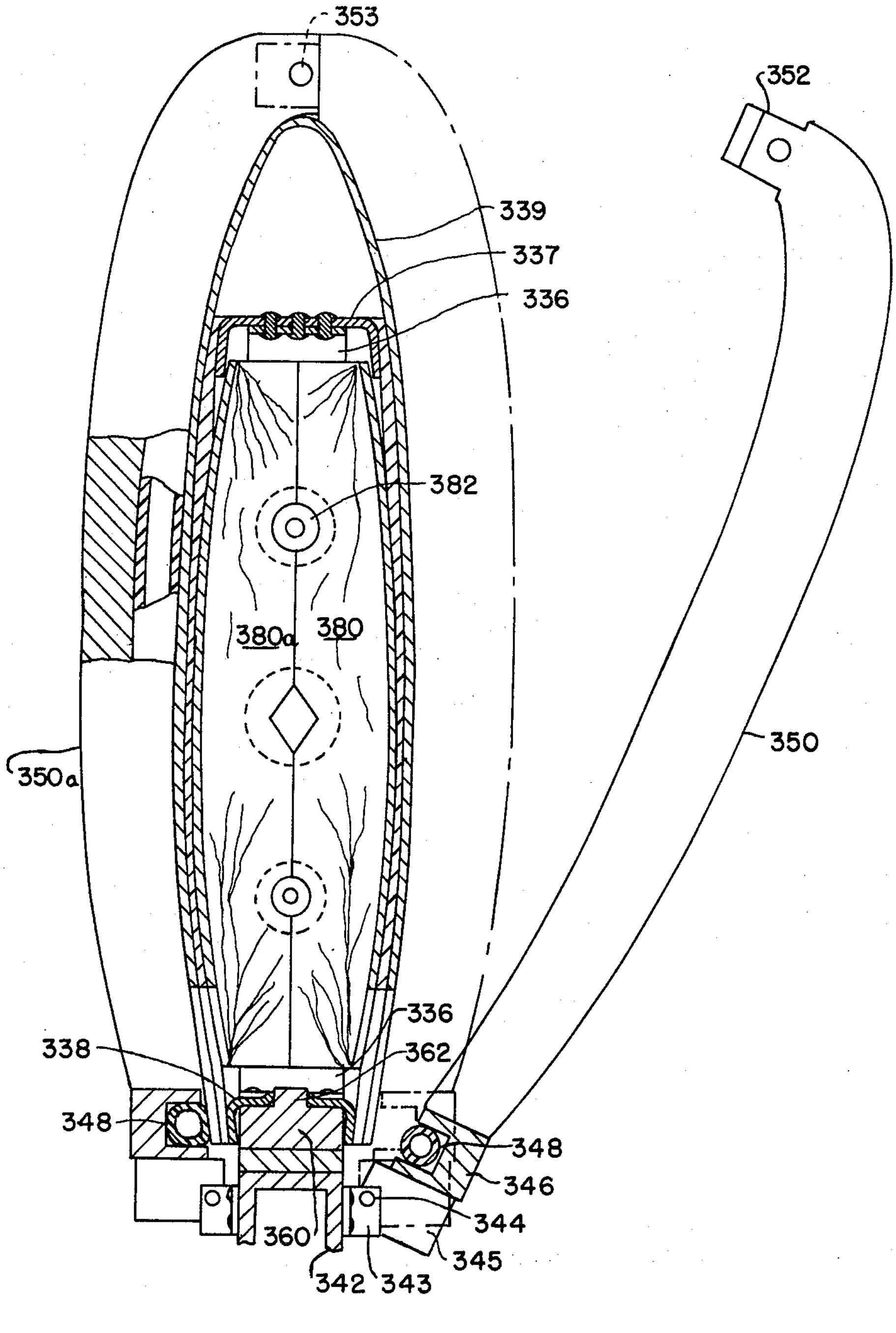
FIG. 34 is a cross-sectional elevational view of the structure of FIG. 32 taken along the line 34—34 with the righthand portion shown in alternative position in phantom.

FIGS. 32 through 34 illustrate the manner of making a stabilizer in jigs embodying the principles of this invention. In this embodiment, the skeleton of the stabilizer has been constructed by means of a rivets rather than bonding. The advantages of a sleeker appearance and reduced drag during flight which are gained by bonded stressed skin construction can still be utilized with a mechanical type of semi-monocoque or monocoque skeleton by use of the novel jigs of this invention.

The stabilizer is made up of three ribs, designated from inboard to outboard as **336*a*, 336*b* and 336*c*, and intermediate and trailing edge spars 337 and 338. The intermediate and trailing edge spars 337 and 338 are channel shaped, and the ribs of flanged stamped metal are similar to those of the wing ribs 100. The ribs 336** have spar engaging flanges on their ends in addition to the skin engaging flanges and are riveted to the spars to form a rigid mechanical skelton for the stabilizer. The skin 339 is bonded to the rib flanges in a manner similar to that disclosed above in connection with the wings and control surfaces in a jig having fluid expansible diaphragms.

The stabilizer jig is generally designated by the number 340. Jig 340 comprises a base member 342 as generally channel-shaped construction. Secured to the sides of the channel member 342 are "L"-shaped brackets 343 through which pivot pins 344 are inserted. Pivot pins 344 permit rotation of elongated side base members 345. Side base members 345 have mounted thereon a channel-shaped member 346 which receives the pressure expansible diaphragm or hose 348 for the application of bonding pressure at the trailing edge of the stabilizer. The pressure for bonding the skin 349 to the ribs and intermediate spar of the stabilizer is applied by hoses 348 in upstanding contoured channel-shaped arms 350 and interconnecting channel member 351 which are secured to and pivot with the channel member 346 and side base member 345. At the tops of the rib arms 350 are projecting apertured tongues 352 for fitting with mating tongues from the rib arms of the opposite side. The opposite side of the jig has the same construction with apertured tongues which overlap to come into alignment for receipt of pins 353 to provide the reaction force for the bonding pressure upon the introduction of fluid pressure into the hose 348.

Pressure is supplied to the hose 348 by means of ap- appropriate manifold 354 supplying the hose 348. Manifold 354 is fed by inlet 355 in a manner previously discussed in connection with the other jigs.

When set in a jig, a stabilizer rear spar 338 rests over the elongated block 360 having locating projections 362 in the top thereof which hold the bottom or trailing edge of the stabilizer in position against longitudinal movement within the jig at the end of the base 342 and upstanding therefrom. Adjacent the outboard end thereof is an upstanding locating arm 364. On the upper end of the arm 364 is a lateral locating block 365 which is apertured to receive a pin 367. The pin 367 passes through the block 365 and into the outboard rib 336*c* to prevent movement thereof relative to the jig. On the inboard end of the base 342 is a larger upstanding locating arm 368 which has at its top a horizontal projection 370. A horizontal projection 370 is apertured to receive a pin 371 which extends vertically through the end of the intermediate spar 337 where it projects past the inboard rib 336*a*. The inboard rib 336*a* extends upwardly beyond the horizontal projection 370 toward the leading edge of the skin 339. The rear upstanding arm 350*a*, as seen in FIGS. 32 and 33 adjacent the rib 336*a*, has a locating hole 374 through which a pin 375 is inserted. The pin 375 extends through the rib 336*a* to hold the top inboard portion of the stabilizer in proper relation to the jig structure.

Transitory reaction members 380 and 380*a* are provided inside of the flanges of the ribs 336*a*, 336*b* and 336*c* to prevent a deflection of the flanges of these ribs during application of the bonding pressure by the application of fluid pressure into the hoses 348. The transitory blocks 380 and 380*a* have a face-to-face longitudinal joint and are held together, when in position, by two-headed fasteners 382 in a manner which can best be seen in FIG. 34. The halves 380 and 380*a*, which provide the reaction force in connection with rib 336*b*, may be removed from the stabilizer structure by means of wires 383 attached thereto through a cutout in the rib 336*a* in a manner similar to the removal of transitory reaction members 355 in connection with the wires.

Thus, it will be seen that, in the case of a mechanically fastened or riveted skeleton, the principles of jag construction and utilization set forth in connection with the invention may be utilized to create a bonded stressed skin construction for the manufacture of light airplanes to provide a sleek appearance and low drag surface.

For ease of description, the principles of the invention have been set forth in connection with but a few illustrated embodiments. It is not our intention that the illustrated embodiments or the terminology employed in describing them be limiting inasmuch as variations in these may be made without departing from the spirit of the invention, but rather, it is our desire to be restricted only by the scope of the apended claims.

The invention claimed is:

1. A jag for assembling and bonding a tubular spar and ribs into a monocoque skeleton structure of a light airplane wing which includes, in combination:
- a frame having a plurality of elongated horizontal support members and upstanding end supports adjacent each of the opposite ends of said support members;
- said upstanding end supports including means for telescopingly engaging the opposite ends of a tubular spar having ribs mounted thereon at a plurality of predetermined rib locations;
- a plurality of upstanding locating plates mounted on said frame, said ribs being in face-to-face engagement with at least a portion of said upstanding locating plates;
- means supported by said frame for supplying selective pressure and heat at each of the joint locations between the spar and a rib.

2. The jig of claim 1 in which the means supported by said frame for supplying selective pressure and heat includes:
- resistance heater pads driven by actuators.

3. The jig of claim 1 which includes means to permit a portion of said locating plates and one of said end supports to move relative to the remainder of said locating plates and the other of said end supports.

4. A jig for assembling and bonding a tubular spar, a trailing edge spar and flanged ribs into a monocoque skeleton structure of a light airplane wing which includes, in combination:
- a frame having a plurality of horizontal elongated support members and upstanding end supports at the opposite ends of said support members;
- said upstanding end supports including support means for engaging the opposite ends of a tubular spar having ribs mounted thereon at a plurality of predetermined rib locations;
- a trailing edge spar support on said frame directly under the axis of said spar when said spar is engaged at its ends by said support means for locating and holding the trailing edge spar portion of the skeleton structure;
- and means on said frame to engage the adjacent marginal edges of a metal skin placed over and substantially against said ribs and spars to tension the skin into a stressed engagement with said rib flanges and trailing end spar;
- and reinforcing means to prevent deflection of said rib flange under the bonding pressure applied thereto by the tensioning of the skin.

5. A jig for assembling and bonding a tubular spar, a trailing edge spar and flanged ribs into a monocoque skeleton structure of a light airplane wing which includes, in combination:
- a frame having a plurality of horizontal elongated support members and upstanding end supports at the opposite ends of said support members;
- said upstanding end supports including support means for telescopingly engaging the opposite ends of a tubular spar having ribs mounted thereon at a plurality of predetermined rib locations;
- a trailing edge spar support on said frame directly under the axis of said spar when said spar is engaged at its ends by said support means for locating and holding the trailing edge spar portion of the skeleton structure;

and means on said frame to the adjacent marginal edges of a metal skin placed over and substantially against said ribs and spars to tension the skin into a stressed engagement with said rib flanges and trailing end spar;

said rib flanges being supported on the inner surface thereof by reinforcing means to prevent their deflection under the bonding pressure applied thereto by the tensioning of the skin.

6. The jag of claim 5 which includes fluid pressure expansible means to create a clamping engagement between said skin and said ribs and trailing edge spar.

References Cited

UNITED STATES PATENTS

| | | | |
|---|---|---|---|
| 1,822,270 | 9/1931 | Bunch | 144—281 |
| 3,078,911 | 2/1963 | Prewitt et al. | 156—581 |
| 2,320,022 | 5/1943 | Wells et al. | 144—281 |

BENJAMIN A. BORCHELT, Primary Examiner

J. J. DEVITT, Assistant Examiner

U.S. Cl. X.R.

156—479; 144—281